United States Patent
Suh et al.

(10) Patent No.: US 10,747,061 B2
(45) Date of Patent: Aug. 18, 2020

(54) DISPLAY DEVICE

(71) Applicant: Samsung Display Co., Ltd., Yongin-si (KR)

(72) Inventors: Duckjong Suh, Gwangmyeong-si (KR); Ho Lim, Suwon-si (KR); Gihoon Yang, Ansan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 218 days.

(21) Appl. No.: 15/651,649

(22) Filed: Jul. 17, 2017

(65) Prior Publication Data

US 2018/0120647 A1 May 3, 2018

(30) Foreign Application Priority Data

Oct. 27, 2016 (KR) ........................ 10-2016-0141419

(51) Int. Cl.
*G02F 1/1337* (2006.01)
*G02F 1/13357* (2006.01)

(52) U.S. Cl.
CPC .. *G02F 1/133723* (2013.01); *G02F 1/133617* (2013.01); *G02F 1/133707* (2013.01);
(Continued)

(58) Field of Classification Search
None
See application file for complete search history.

(56) References Cited

U.S. PATENT DOCUMENTS

| | | | |
|---|---|---|---|
| 2007/0007881 A1 | 1/2007 | Kim et al. | |
| 2010/0079704 A1* | 4/2010 | Cho | G02F 1/133617 349/71 |

(Continued)

FOREIGN PATENT DOCUMENTS

| | | |
|---|---|---|
| CN | 105353554 | 2/2016 |
| KR | 10-2010-0037283 | 4/2010 |

(Continued)

OTHER PUBLICATIONS

Sakaue et al., "Thermal stability characterization for practical use of quantum-dot based global optical sensor on anodized-aluminum," Sensors and Actuators B, Apr. 30, 2013, pp. 174-178, vol. 185, Elsevier B.V.

(Continued)

*Primary Examiner* — Phu Vu
(74) *Attorney, Agent, or Firm* — H.C. Park & Associates, PLC

(57) ABSTRACT

A display device includes a display panel and a light source to provide a first color light to the display panel. The display panel includes a first substrate, a second substrate facing the first substrate, a liquid crystal (LC) layer disposed between the first substrate and the second substrate, a first alignment-inducing layer disposed between the first substrate and the LC layer, a second alignment-inducing layer disposed between the second substrate and the LC layer, a color conversion layer disposed on the LC layer. The second substrate is disposed more adjacent to the light source than the first substrate. The LC layer includes LC molecules. The first alignment-inducing layer includes a polymerized first reactive mesogen. The color conversion layer includes an illuminant to absorb the first color light from the light source to emit a color of light different from a first color of the first color light.

30 Claims, 14 Drawing Sheets

(52) U.S. Cl.
CPC .......... *G02F 1/133788* (2013.01); *G02F 2001/133726* (2013.01)

(56) References Cited

U.S. PATENT DOCUMENTS

| | | |
|---|---|---|
| 2012/0282838 A1 | 11/2012 | Kim |
| 2016/0026041 A1 | 1/2016 | Lim |
| 2016/0033823 A1 | 2/2016 | Lee et al. |
| 2016/0124277 A1* | 5/2016 | Lee .......... G02F 1/134336 349/123 |
| 2016/0200978 A1* | 7/2016 | Bae .......... C09K 19/3402 349/123 |
| 2017/0255054 A1 | 9/2017 | Li |
| 2018/0023000 A1 | 1/2018 | Lim |
| 2018/0046034 A1 | 2/2018 | Lim et al. |
| 2018/0081243 A1* | 3/2018 | Lim .......... C09K 19/56 |

FOREIGN PATENT DOCUMENTS

| | | |
|---|---|---|
| KR | 10-1110071 | 2/2012 |
| KR | 10-2016-0036543 | 4/2016 |
| KR | 10-2016-0067151 | 6/2016 |
| KR | 10-2016-0071301 | 6/2016 |
| KR | 10-2018-0018876 | 2/2018 |

OTHER PUBLICATIONS

Extended European Search Report dated Feb. 13, 2018, in European Patent Application No. 17192408.7.

* cited by examiner

DISPLAY DEVICE

CROSS-REFERENCE TO RELATED APPLICATION

This application claims priority from and the benefit of Korean Patent Application No. 10-2016-0141419, filed on Oct. 27, 2016, which is hereby incorporated by reference for all purposes as if fully set forth herein.

BACKGROUND

Field

One or more exemplary embodiments relate to a display technology, and, more specifically, to a display device including a color conversion member containing an illuminant.

Discussion

Liquid crystal layers of conventional liquid crystal display devices may be classified into different types of alignment modes, such as a twisted-nematic mode liquid crystal display device, a horizontal electric field mode liquid crystal display device, and a vertical alignment mode liquid crystal display device. Among these different types of modes, a vertical alignment liquid mode crystal display device may include liquid crystal molecules being aligned in a determined direction when no electric field is applied to the liquid crystal layer, e.g., long axes of the liquid crystal molecules may be aligned vertical to a substrate surface of the liquid crystal display device when no electric field is applied to the liquid crystal layer. Alignment of the liquid crystal molecules in the determined direction may be achieved via a rubbing method, an optical alignment method, and/or the like. For instance, the liquid crystal molecules may be aligned in the determined direction using a reactive monomer. Accordingly, a conventional vertical alignment mode liquid crystal display device may exhibit relatively wide viewing angles, high contrast ratios, fast response times, etc.

The above information disclosed in this section is only for enhancement of an understanding of the background of the inventive concepts, and, therefore, it may contain information that does not form prior art already known to a person of ordinary skill in the art.

SUMMARY

One or more exemplary embodiments provide a display device including an illuminant to improve color purity and reliability.

One or more exemplary embodiments provide a display device capable of improving optical efficiency of an illuminant.

Additional aspects will be set forth in the detailed description which follows, and, in part, will be apparent from the disclosure, or may be learned by practice of the inventive concepts.

According to one or more exemplary embodiments, a display device includes a display panel and a light source to provide a first color light to the display panel. The display panel includes a first substrate, a second substrate facing the first substrate, a liquid crystal layer disposed between the first substrate and the second substrate, a first alignment-inducing layer disposed between the first substrate and the liquid crystal layer, a second alignment-inducing layer disposed between the second substrate and the liquid crystal layer, a color conversion layer disposed on the liquid crystal layer. The second substrate is disposed more adjacent to the light source than the first substrate. The liquid crystal layer includes liquid crystal molecules. The first alignment-inducing layer includes a polymerized first reactive mesogen. The color conversion layer includes an illuminant to absorb the first color light from the light source to emit a color of light different from a first color of the first color light.

According to one or more exemplary embodiments, a display device includes a display panel and a light source to provide a first color light to the display panel. The display panel includes a first substrate, a second substrate facing the first substrate, a liquid crystal layer disposed between the first substrate and the second substrate, a first alignment-inducing layer disposed between the first substrate and the liquid crystal layer, a second alignment-inducing layer disposed between the second substrate and the liquid crystal layer, a first polarizing layer disposed between the first alignment-inducing layer and the first substrate, a second polarizing layer disposed on the first polarizing layer, and a color conversion layer disposed directly on the first substrate. The second substrate is disposed more adjacent to the light source than the first substrate. The liquid crystal layer includes liquid crystal molecules. The first alignment-inducing layer includes a polymerized first reactive mesogen. The color conversion layer includes an illuminant to absorb the first color light to emit a color of light different from a first color of the first color light.

According to one or more exemplary embodiments, a display device includes a light source to emit a blue light and a display panel disposed on the light source. The display panel includes a green light emitting area, a red light emitting area, and a blue light emitting area. The display panel further includes a first substrate, a second substrate facing the first substrate, a liquid crystal layer disposed between the first substrate and the second substrate, a first alignment-inducing layer disposed between the first substrate and the liquid crystal layer, a second alignment-inducing layer disposed between the second substrate and the liquid crystal layer, a color conversion layer disposed between the first alignment-inducing layer and the first substrate, a first polarizing layer disposed between the color conversion layer and the liquid crystal layer, and a second polarizing layer facing the first polarizing layer. The second substrate is disposed more adjacent to the light source than the first substrate. The first alignment-inducing layer includes a polymerized reactive mesogen. The second polarizing layer is disposed more adjacent to the light source than the first polarizing layer. The color conversion layer includes a first conversion part disposed in correspondence with the green light emitting area, a second conversion part disposed in correspondence with the red light emitting area, and a third conversion part disposed in correspondence with the blue light emitting area. The first conversion part includes a first illuminant to absorb the blue light to emit a green light. The second conversion part includes a second illuminant to absorb the blue light to emit a red light. The third conversion part being configured to transmit the blue light.

According to one or more exemplary embodiments, at least one alignment-including layer among alignment-inducing layers used to align liquid crystal molecules includes a polymerized reactive mesogen. In this manner, relatively high temperature manufacturing process(es) may be omitted, and, as such, light efficiency of an illuminant included in a color conversion layer may be improved. Furthermore, the alignment-inducing layer may be formed including the polymerized reactive mesogen, and the color conversion layer may be formed including a fluorescent substance or a quantum dot. Accordingly, a color gamut and reliability of light emitting efficiency may be improved.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
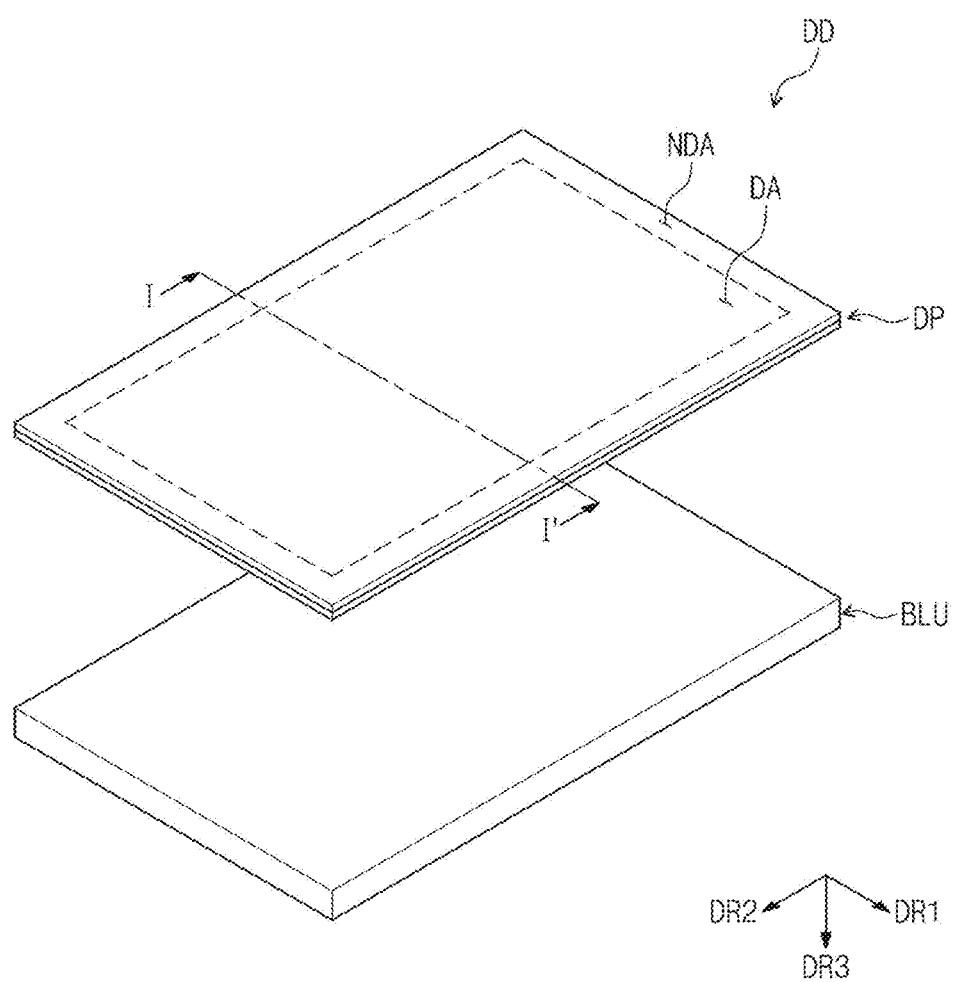
FIG. 1 is an exploded perspective view of a display device, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. To this end, various exemplary embodiments may be different, but do not have to be exclusive. For example, specific shapes, configurations, and characteristics of an exemplary embodiment may be implemented in another exemplary embodiment without departing from the spirit and the scope of the present disclosure.

Unless otherwise specified, the illustrated exemplary embodiments are to be understood as providing exemplary features of varying detail of various exemplary embodiments. Therefore, unless otherwise specified, the features, components, modules, layers, films, panels, regions, aspects, etc. (hereinafter collectively referred to as "elements"), of the various illustrations may be otherwise combined, separated, interchanged, and/or rearranged without departing from the disclosed exemplary embodiments. Further, in the accompanying figures, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Further, the D1-axis, the D2-axis, and the D3-axis are not limited to three axes of a rectangular coordinate system, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the present disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations (or margins of error) in measured, calculated, and/or provided values that would be recognized by one of ordinary skill in the art.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, one or more exemplary embodiments may be described and/or illustrated in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of one or more exemplary embodiments may be physically separated into two or more interacting and discrete blocks, units, and/or modules without departing from the spirit and scope of the inventive concepts. Further, the blocks, units, and/or modules of one or more exemplary embodiments may be physically combined into more complex blocks, units, and/or modules without departing from the spirit and scope of the inventive concepts.

Figure 2:
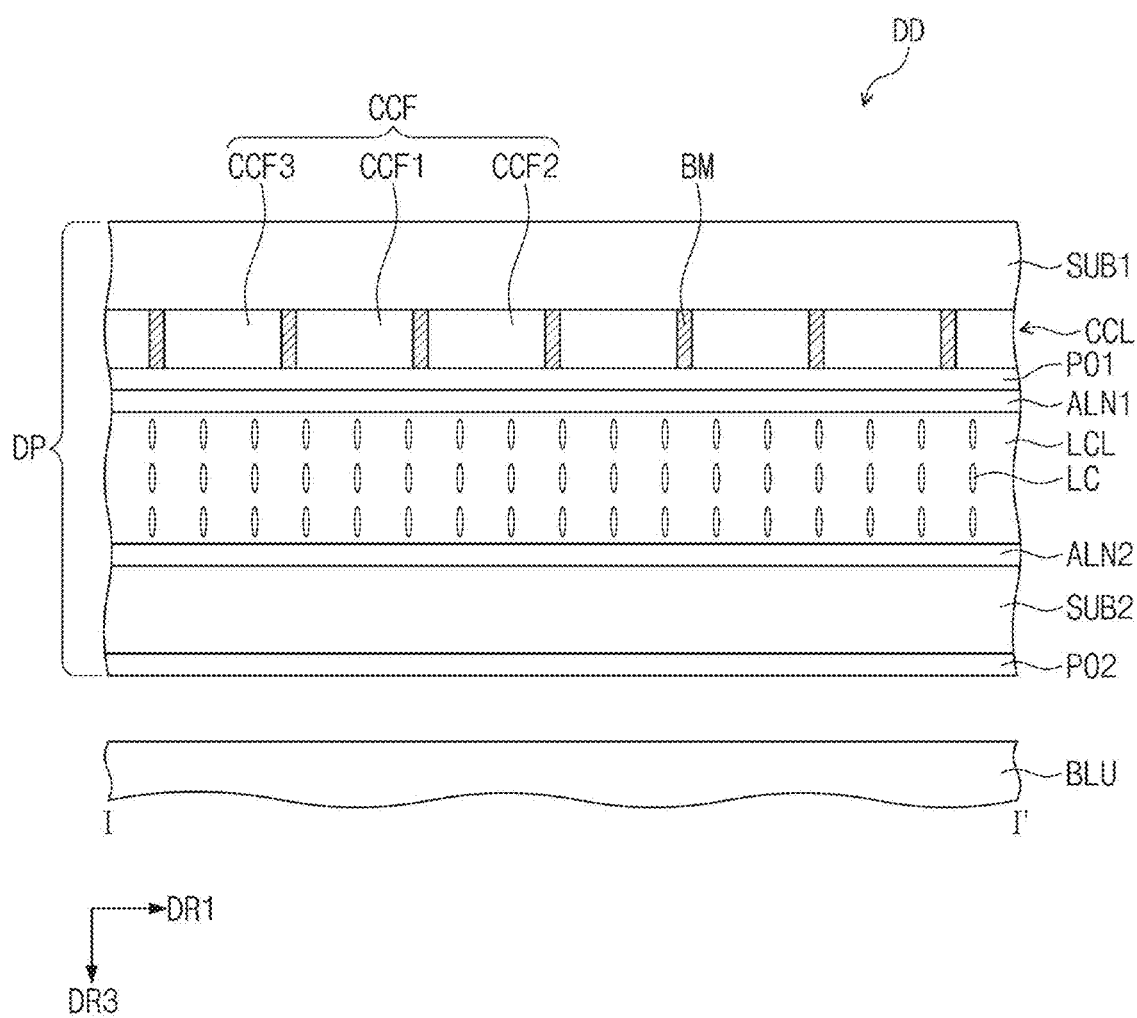
FIG. 2 is a cross-sectional view of the display device of FIG. 1 taken along sectional line I-I', according to one or more exemplary embodiments.

FIG. 1 is an exploded perspective view of a display device, according to one or more exemplary embodiments. FIG. 2 is a cross-sectional view of the display device of FIG. 1 taken along sectional line I-I', according to one or more exemplary embodiments.

Referring to FIGS. 1 and 2, the display device DD includes a display panel unit (or display panel) DP and a light source unit (or light source) BLU that provides light to the display panel unit DP. The display panel unit DP displays an image, and the light source unit BLU generates a first color light. It is noted, however, that the light source unit BLU may be configured to generate one or more first colors of light.

The light source unit BLU generates the first color light and provides the first color light to the display panel unit DP. The light source unit BLU may be disposed under the display panel unit DP to provide the first color light to the display panel unit DP. Exemplary embodiments, however, are not limited thereto or thereby. For instance, the light source unit BLU may be an edge-type light source disposed at one or more edges of the display panel unit DP to provide the first color light to the display panel unit DP. The first color light generated by the light source unit BLU may be, but is not limited to, a blue light. In addition, the first color light may be an ultraviolet light. For instance, the light source unit BLU may generate light having a wavelength range greater than or equal to about 350 nm and less than or equal to about 450 nm, e.g., greater than or equal to about 400 nm and less than or equal to about 500 nm, such as greater than or equal to about 470 nm and less than or equal to about 500 nm.

The light source unit BLU may include a plurality of light emitting devices (not shown). The light source unit BLU may include a plurality of light emitting devices and a circuit board (not illustrated) providing a power source to the light emitting devices. The light emitting devices of the light source unit BLU may be arranged on the circuit board. As an example, the light emitting devices of the light source unit BLU may generate the blue light.

The first color light generated by the light source unit BLU may be provided to the display panel unit DP. The display panel unit DP may be disposed on the light source unit BLU. The display panel unit DP may include a display area DA displaying an image and a non-display area NDA not displaying the image. For instance, the non-display area NDA may be disposed outside the display area DA.

The display panel unit DP may have a plate-like shape including a planar surface defined in a first direction DR1 and a second direction DR2. For instance, the display area DA may have a substantially rectangular shape when viewed in a thickness direction, e.g., a third direction DR3, of the display device DD. The third direction DR3 may be a direction in which an observer views a surface (e.g., front surface) of the display device DD.

Although the display device DD shown in FIGS. 1 and 2 has a flat shape, exemplary embodiments are not limited to thereto or thereby. For example, the display device DD may be a curved display device. For instance, the display device DD may be a concave-curved or convex-curved display device when the observer views the display device DD in the third direction DR3. In addition, the display device DD may be partially bent. According to one or more exemplary embodiments, the display device DD may be a flexible display device. For instance, the display device DD may be a foldable display device, a rollable display device, etc.

The display area DA of the display panel unit DP may include a plurality of pixel areas (not shown). The pixel areas may be defined by a plurality of gate lines (not shown) and a plurality of data lines (not illustrated). The pixel areas may be arranged in a matrix formation, however, exemplary embodiments are not limited thereto or thereby. Pixels PX (refer to FIGS. 3A and 3B) may be respectively arranged in the pixel areas.

The display panel unit DP includes a first substrate SUB1, a second substrate SUB2 facing the first substrate SUB1, and a liquid crystal layer LCL. The liquid crystal layer LCL is disposed between the first substrate SUB1 and the second substrate SUB2.

Each of the first substrate SUB1 and the second substrate SUB2 may be a polymer substrate, a plastic substrate, a glass substrate, a quartz substrate, or the like. The first substrate SUB1 and the second substrate SUB2 may be transparent insulating substrates. Each of the first substrate SUB1 and the second substrate SUB2 may be rigid and/or flexible. For instance, at least a first portion of the first substrate SUB1 and the second substrate SUB2 may be rigid and at least a second portion of the first substrate SUB1 and the second substrate SUB2 may be flexible.

Although not shown in the figures, the first substrate SUB1 and the second substrate SUB2 may include a common electrode and a pixel electrode, respectively. The common electrode may be disposed on the first substrate SUB1, and the pixel electrode may be disposed on the second substrate SUB2. That is, the common electrode may be disposed on a surface (e.g., lower surface) of the first substrate SUB1 facing the liquid crystal layer LCL, and the pixel electrode may be disposed on a surface (e.g., upper surface) of the second substrate SUB2 facing the liquid crystal layer LCL. Exemplary embodiments, however, are not limited thereto or thereby. For descriptive convenience, the lower surface of the first substrate SUB1 may correspond to a surface that is more adjacent to the liquid crystal layer LCL than another surface of the first substrate SUB1, the other surface opposing the lower surface. Also, for descriptive convenience, the upper surface of the second substrate SUB2 may correspond to a surface that is more adjacent to the liquid crystal layer LCL than another surface of the second substrate SUB2, the other surface opposing the upper surface.

The liquid crystal layer LCL is disposed between the first substrate SUB1 and the second substrate SUB2 and includes liquid crystal molecules LC. The liquid crystal molecules LC have a dielectric anisotropy and are aligned in a determined direction when an electric field is not applied to the liquid crystal layer LCL. The liquid crystal molecules LC are not be limited to a specific type of liquid crystal molecules. For instance, the liquid crystal molecules LC may be an alkenyl-based compound, an alkoxy-based compound, etc. It will be assumed that the liquid crystal molecules LC have a negative dielectric anisotropy, but the liquid crystal molecules LC may have a positive dielectric anisotropy according to one or more exemplary embodiments.

The display panel unit DP may include a first alignment-inducing layer ALN1 and a second alignment-inducing layer ALN2. The first alignment-inducing layer ALN1 is disposed between the first substrate SUB1 and the liquid crystal layer LCL, and the second alignment-inducing layer ALN2 is disposed between the second substrate SUB2 and the liquid crystal layer LCL. That is, the first alignment-inducing layer ALN1 and the second alignment-inducing layer ALN2 are disposed to face each other such that the liquid crystal layer LCL is disposed between the first alignment-inducing layer ALN1 and the second alignment-inducing layer ALN2. The first alignment-inducing layer ALN1 and the second alignment-inducing layer ALN2 may align the liquid crystal molecules LC of the liquid crystal layer LCL to have a determined pre-tilt angle. The pre-tilt angle may be an angle formed between a long axis of the liquid crystal molecules LC and a surface of the first alignment-inducing layer ALN1 and the second alignment-inducing layer ALN2. For instance, the pre-tilt angle of vertical alignment liquid crystals may be about 90 degrees.

Although not illustrated with respect to a common electrode, the first alignment-inducing layer ALN1 may be disposed on the common electrode that is disposed on the first substrate SUB1. That is, the first alignment-inducing layer ALN1 may be disposed on a surface (e.g., lower surface) of the common electrode. The lower surface of the common electrode may correspond to a surface that is disposed more adjacent to the liquid crystal layer LCL than another surface of the common electrode that opposes the lower surface.

Although not illustrated with respect to a pixel electrode, the second alignment-inducing layer ALN2 may be disposed on the pixel electrode. The second alignment-inducing layer ALN2 may be disposed between the second substrate SUB2 and the liquid crystal layer LCL. That is, the second alignment-inducing layer ALN2 may be disposed on a surface (e.g., upper surface) of the pixel electrode. The upper surface of the pixel electrode may correspond to a surface that is disposed more adjacent to the liquid crystal layer LCL than another surface of the pixel electrode that opposes the upper surface. The alignment-inducing layers will be described in more detail later.

The display device DD may also include a color conversion layer CCL. As an example, the color conversion layer CCL may be disposed above an upper surface of the liquid crystal layer LCL. The upper surface of the liquid crystal layer LCL corresponds to a surface that is disposed more adjacent to the first substrate SUB1 than another surface of the liquid crystal layer LCL, the other surface opposing the upper surface. The color conversion layer CCL may include an illuminant that absorbs the first color light provided from the light source unit BLU and emits a light having a different color from the first color. The color conversion layer CCL will be described in more detail later.

Figure 3A:
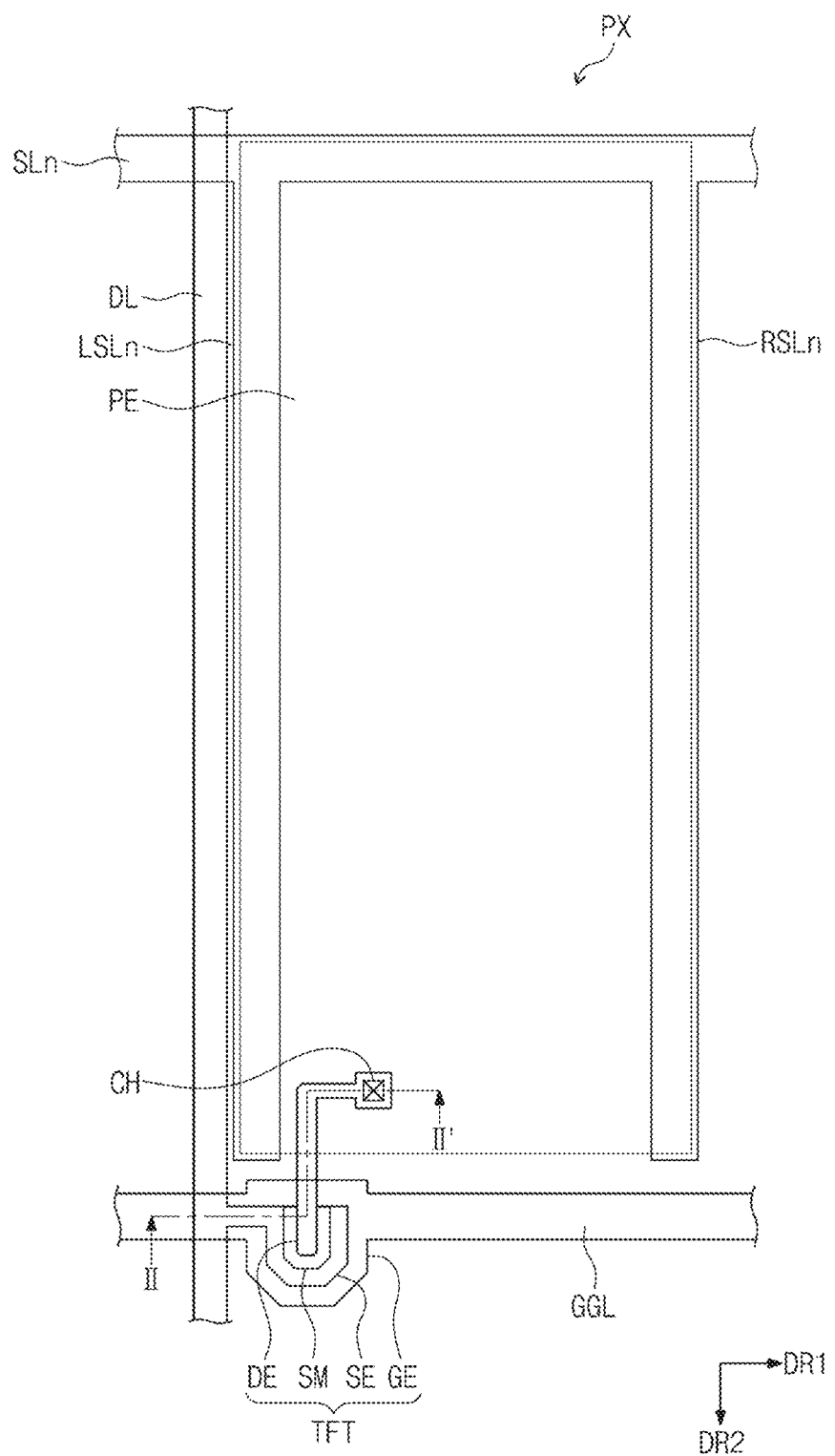
FIGS. 3A and 3B are plan views of a pixel among pixels of a display device, according to one or more exemplary embodiments.
Figure 3B:
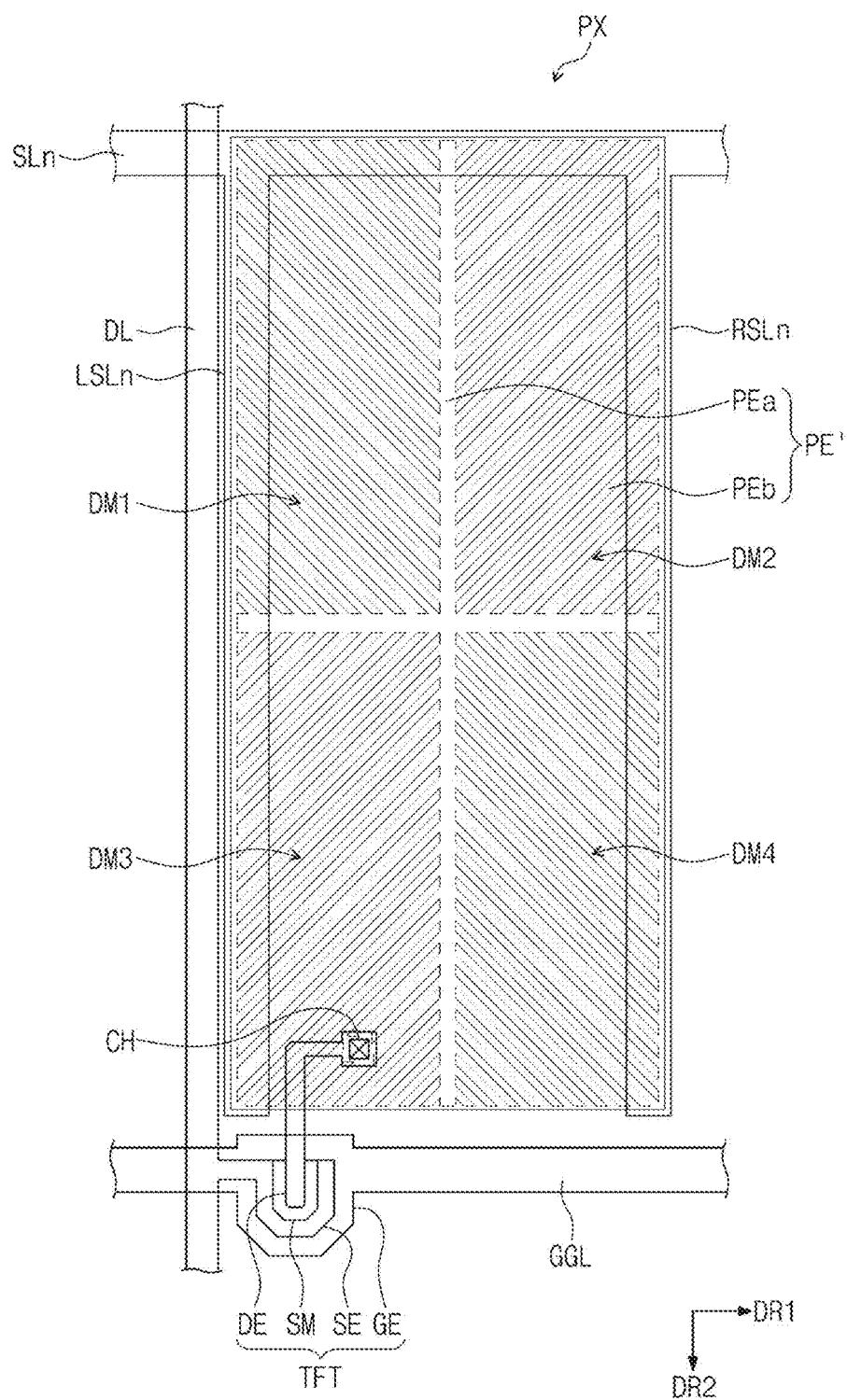
Figure 4:
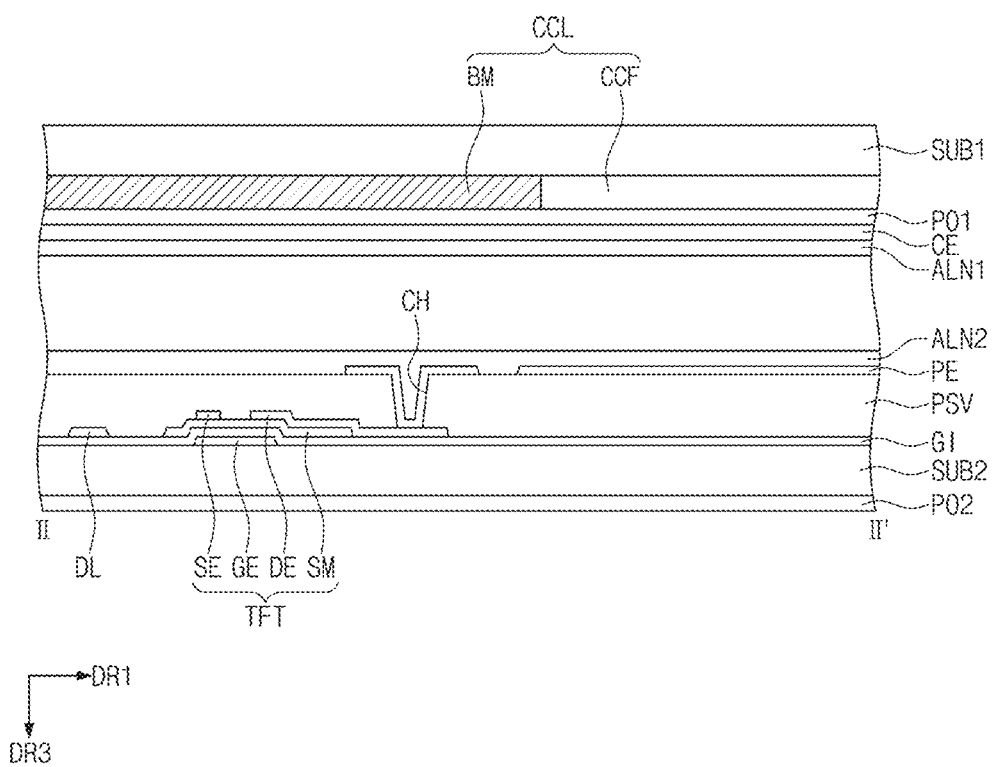
FIG. 4 is a cross-sectional view of the pixel of FIG. 3A taken along sectional line II-II', according to one or more exemplary embodiments.

FIGS. 3A and 3B are plan views of a pixel among pixels of a display device, according to one or more exemplary embodiments. FIG. 4 is a cross-sectional view of the pixel of FIG. 3A taken along sectional line II-II', according to one or more exemplary embodiments.

It is noted that FIGS. 3A and 3B show only one pixel, but other pixels of the display device may have the same structure as that of the pixel shown in FIGS. 3A and 3B. It is also noted that FIGS. 3A and 3B show one pixel PX connected to one gate line GGL among gate lines and one data line DL among data lines, but the structure of the pixel PX is not be limited thereto or thereby. For instance, a plurality of pixels may be connected to one gate line and one data line, or one pixel may be connected to a plurality of gate lines and plurality of data lines.

Referring to FIGS. 1, 2, 3A, 3B, and 4, the gate line GGL extends in the first direction DR1. The gate line GGL is arranged on the second substrate SUB2. The data line DL extends in the second direction DR2 crossing the first direction DR1 in which the gate line GGL extends.

Each of the pixels PX includes a thin film transistor TFT, a pixel electrode PE connected to the thin film transistor TFT, and a storage electrode part. The thin film transistor TFT includes a gate electrode GE, a gate insulating layer GI, a semiconductor pattern SM, a source electrode SE, and a drain electrode DE. The storage electrode part includes a storage line SLn extending in the first direction DR1, a first branch electrode LSLn branched from the storage line SLn and extending in the second direction DR2, and a second branch electrode RSLn branched from the storage line SLn and extending in the second direction DR2.

The gate electrode GE is protruded from the gate line GGL, placed on a portion of the gate line GGL, or otherwise connected to the gate line GGL. The gate electrode GE may include a conductive material, e.g., a conductive metal material. For instance, the gate electrode GE may include nickel, chromium, molybdenum, aluminum, titanium, copper, tungsten, or an alloy thereof. The gate electrode GE may have a single-layer structure or a multi-layer structure of the metal material(s). For instance, the gate electrode GE may have a three-layer structure of molybdenum, aluminum, and molybdenum, which are sequentially stacked one on another, or a two-layer structure of titanium and copper, which are sequentially stacked. As another example, the gate electrode GE may have a single-layer structure of an alloy of titanium and copper.

The semiconductor pattern SM is disposed on the gate insulating layer GI. The semiconductor pattern SM is disposed above the gate electrode GE such that the gate insulating layer GI is disposed between the semiconductor pattern SM and the gate electrode GE. A portion of the semiconductor pattern SM is overlapped with the gate electrode GE. The semiconductor pattern SM includes an active pattern (not shown) disposed on the gate insulating layer GI and an ohmic contact layer (not shown) disposed on the active pattern. For instance, the active pattern may include an amorphous silicon thin film, and the ohmic contact layer may include an n+ amorphous silicon thin film; however, exemplary embodiments are not limited thereto or thereby. The ohmic contact layer may allow the active pattern to be in ohmic contact with the source electrode SE and the drain electrode DE.

The source electrode SE is branched from the data line DL or connected to the data line DL. The source electrode SE is disposed on the ohmic contact layer (not shown), and a portion of the source electrode SE is overlapped with the gate electrode GE. The data line DL is disposed on the gate insulating layer GI in an area in which the semiconductor pattern SM is not disposed. The drain electrode DE is spaced apart from the source electrode SE such that the semiconductor pattern SM is disposed between the drain electrode DE and the source electrode SE when viewed in a plan view, e.g., when viewed in the third direction DR3. The drain electrode DE is disposed on the ohmic contact layer (not shown), and a portion of the drain electrode DE is overlapped with the gate electrode GE.

The source electrode SE and the drain electrode DE may include a conductive material, e.g., a conductive metal material. For instance, the source electrode SE and the drain electrode DE may include nickel, chromium, molybdenum, aluminum, titanium, copper, tungsten, or an alloy thereof. The source electrode SE and the drain electrode DE may have a single-layer structure or a multi-layer structure of the metal material(s). For instance, the source electrode SE and the drain electrode DE may have a two-layer structure of titanium and copper, which are sequentially stacked. As another example, the source electrode SE and the drain electrode DE may have a single-layer structure of an alloy of titanium and copper.

A surface (e.g., upper surface) of the active pattern is exposed between the source electrode SE and the drain electrode DE, and the active pattern may serve as a channel part, e.g., a conductive channel, between the source electrode SE and the drain electrode DE when voltage is applied to the gate electrode GE. The source electrode SE and the drain electrode DE are overlapped with the semiconductor pattern SM except for the channel part between the source electrode SE and the drain electrode DE.

The pixel electrode PE is connected to the drain electrode DE after passing through a protective layer PSV disposed between the pixel electrode PE and the drain electrode DE. The pixel electrode PE is partially overlapped with the storage line SLn, the first branch electrode LSLn, and the second branch electrode RSLn to form a storage capacitor.

The protective layer PSV covers the source electrode SE, the drain electrode DE, the channel part, and the gate insulating layer GI. The protective layer PSV is provided with a contact hole CH formed therein to expose a portion of the drain electrode DE. The protective layer PSV may include silicon nitride, silicon oxide, silicon oxynitride, etc.

The pixel electrode PE is connected to the drain electrode DE through the contact hole CH formed through the protective layer PSV. The pixel electrode PE includes a transparent conductive material. For example, the pixel electrode PE includes a transparent conductive oxide, e.g., aluminum zinc oxide (AZO), gallium zinc oxide (GZO), indium tin oxide (ITO), indium zinc oxide (IZO), indium tin zinc oxide (ITZO), etc. It is also contemplated that one or more conductive polymers (ICP) may be utilized, such as, for example, polyaniline (PAM), poly(3,4-ethylenedioxythiophene) poly(styrenesulfonate) (PEDOT:PSS), etc.

The pixel electrode PE' shown in FIG. 3B has the same structure and function as those of the pixel electrode PE shown in FIG. 3A except that the pixel electrode PE' of FIG. 3B is divided into a plurality of domains, e.g., first through fourth domains DM1, DM2, DM3, and DM4. The pixel electrode PE' includes a trunk portion PEa and a plurality of branch portions PEb extending from the trunk portion PEa in a radial form. The trunk portion PEa or a part of the branch portions PEb is connected to the drain electrode DE through the contact hole CH.

The trunk portion PEa may have various shapes. For example, the trunk portion PEa has a cross shape as shown in FIG. 3B. In this case, the branch portions PEb are spaced apart from each other such that the branch portions PEb do not meet with each other (or touch one another), and the branch portions PEb arranged in the same area (e.g., domain) among areas (e.g., first through fourth domains DM1, DM2, DM3, and DM4) defined by the trunk portion PEa extend substantially parallel to each other. The branch portions PEb, which are adjacent to each other, are spaced apart from each other in terms of micrometer. The formation of the branch portions PEb may align liquid crystal molecules LC of the liquid crystal layer LCL to a specific azimuth.

Each of the pixels PX includes a plurality of domains, e.g., first through fourth domains DM1, DM2, DM3, and DM4. The branch portions PEb are arranged in each of the first through fourth domains DM1, DM2, DM3, and DM4 and extend in different directions according to the first through fourth domains DM1, DM2, DM3, and DM4. Although FIG. 3B illustrates the pixel PX including four domains, exemplary embodiments are not limited thereto or thereby. In this manner, any suitable number of the domains may be included in each pixel PX. For instance, each pixel PX may include two, six, eight, etc., domains. In addition, the arrangement of the first through fourth domains DM1, DM2, DM3, and DM4 is not limited to or by the illustrated arrangement. For example, the domains may be distinguished from each other by aligning the trunk portion PEa to be parallel to the first direction DR1 or the second direction DR2. Further, the second alignment-inducing layer ALN2 may be disposed on the pixel electrode PE and the protective layer PSV.

The color conversion layer CCL and the common electrode CE may be disposed on the first substrate SUB1. In addition, a first polarizing layer PO1 and the first alignment-inducing layer ALN1 may be further disposed on the first substrate SUB1. The first polarizing layer PO1 may be disposed on a surface (e.g., lower surface) of the color conversion layer CCL. The first polarizing layer PO1 may be disposed between the common electrode CE and the color conversion layer CCL.

The color conversion layer CCL may include a conversion part CCF and a light blocking part (e.g., a black matrix) BM. The light blocking part BM is disposed to correspond to a light blocking area of the first substrate SUB1. The light blocking area corresponds to an area in which the data line DL, the thin film transistor TFT, and the gate line GGL are arranged. The light blocking part BM is disposed to block light leakage, e.g., light leakage between pixels of the display device DD. In one or more exemplary embodiments, the light blocking part BM is included in the color conversion layer CCL disposed on the first substrate SUB1, but exemplary embodiments are not limited thereto or thereby. For instance, the light blocking part BM may be disposed on the second substrate SUB2 or may be disposed on the first substrate SUB1 as a separate layer from the color conversion layer CCL.

The common electrode CE is disposed on the first substrate SUB1 and forms an electric field with the pixel electrode PE to control the liquid crystal molecules LC of the liquid crystal layer LCL. In one or more exemplary embodiments, the common electrode CE is disposed on the first substrate SUB1, but the common electrode CE may be disposed on the second substrate SUB2. The common electrode CE may include a transparent conductive material. The common electrode CE may include, for example, a conductive metal oxide, such as aluminum zinc oxide (AZO), gallium zinc oxide (GZO), indium tin oxide (ITO), indium zinc oxide (IZO), indium tin zinc oxide (ITZO), etc. It is also contemplated that one or more conductive polymers (ICP) may be utilized, such as, for example, polyaniline (PANT), poly(3,4-ethylenedioxythiophene) poly(styrenesulfonate) (PEDOT:PSS), etc. The first alignment-inducing layer ALN1 may be disposed on the common electrode CE. For example, the first alignment-inducing layer ALN1 may be disposed on the lower surface of the common electrode CE as shown in FIG. 4. The lower surface of the common electrode CE may correspond to a surface that is disposed more adjacent to the liquid crystal layer LCL than another surface of the common electrode CE opposing the surface.

In one or more exemplary embodiments, the first alignment-inducing layer ALN1 may be an alignment layer including a reactive mesogen. The first alignment-inducing layer ALN1 may include the reactive mesogen containing a polymerizable reactive group.

The reactive mesogen may be a compound having the polymerizable reactive group at, at least one end thereof. For instance, the reactive mesogen may be a compound having the polymerizable reactive group at opposite ends thereof with respect to a core part or at one end thereof with respect to the core part.

In one or more exemplary embodiments, the reactive mesogen may be a compound having an anchoring group. The reactive mesogen may be a compound having the polymerizable reactive group at one end thereof and the anchoring group, which may be fixed to a substrate, at the other end thereof. The anchoring group of the polymerizable reactive group may be a hydrogen bond functional group. The anchoring group may be a functional group absorbed onto (or into) the substrate, on which the reactive mesogen is provided, to form the hydrogen bond. For instance, the anchoring group may be absorbed onto (or into) the common electrode CE disposed on the first substrate SUB1 to form the hydrogen bond. The anchoring group of the reactive mesogen may be a functional group having at least one of nitrogen and oxygen. In addition, the polymerized reactive mesogen included in the first alignment-inducing layer ALN1 may include a vertical alignment group.

According to one or more exemplary embodiments, the first alignment-inducing layer ALN1 does not include polyimide and may be formed to include the polymerized reactive mesogen.

The second alignment-inducing layer ALN2 may include at least one of the polymerized reactive mesogen and polyimide. That is, the second alignment-inducing layer ALN2 may be an alignment layer including the polymerized reactive mesogen or an alignment layer including polyimide. As another example, the second alignment-inducing layer ALN2 may be an alignment layer including both the polymerized reactive mesogen and polyimide. In the case that the second alignment-inducing layer ALN2 is an alignment layer including the polymerized reactive mesogen, the second alignment-inducing layer ALN2 may be an alignment layer that does not including polyimide. In addition, in the case that the second alignment-inducing layer ALN2 is an alignment layer including polyimide, the second alignment-inducing layer ALN2 may include the polymerized reactive mesogen at a portion of the polyimide alignment layer.

According to one or more exemplary embodiments, the first alignment-inducing layer ALN1 may be formed to include a first reactive mesogen that is polymerized, and the second alignment-inducing layer ALN2 may be formed to include a second reactive mesogen that is polymerized. In the case that the first alignment-inducing layer ALN1 and the second alignment-inducing layer ALN2 include the polymerized reactive mesogen, the first polymerized reactive mesogen included in the first alignment-inducing layer ALN1 may be the same as or different from the second polymerized reactive mesogen included in the second alignment-inducing layer ALN2.

The polymerized reactive mesogen forming the first alignment-inducing layer ALN1 may be formed from derivatives of a compound represented by Formula 1 or 2 provided below. That is, the first alignment-inducing layer ALN1 may be formed to include the polymerized reactive mesogen generated after a polymerization reaction of the compound represented by Formula 1 or 2 is completed. The first alignment-inducing layer ALN1 may be formed to include at least one of the compounds represented by the following Formula 1 and the compound represented by the following Formula 2:

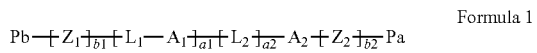

Formula 1

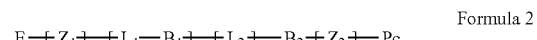

Formula 2

In Formulae 1 and 2, $A_1$, $A_2$, $B_1$, and $B_2$ are each independently a substituted or unsubstituted divalent hydrocarbon ring or a substituted or unsubstituted divalent heterocycle. In addition, a1, a3, b1, b2, b3, and b4 are each independently an integer 0 to 6, and a2 and a4 are each independently 0 or 1. In addition, $L_1$ and $L_2$ are a linkage group, and $Z_1$ and $Z_2$ are a spacer group. Further, Pa, Pb, and Pc are a polymerizable group. Also, E may be a hydrogen bond functional group including at least one of a nitrogen atom and an oxygen atom.

According to one or more exemplary embodiments, the first alignment-inducing layer ALN1 may be formed of the reactive mesogen represented by Formula 1. The first alignment-inducing layer ALN1 may be formed of the reactive mesogen represented by Formula 2. In addition, the first alignment-inducing layer ALN1 may be formed to include the reactive mesogen represented by Formula 1 and the reactive mesogen represented by Formula 2. It is also contemplated that the first alignment-inducing layer ALN1 may be formed of a reactive mesogen including at least one of acrylate, methacrylate, epoxy, oxetane, vinyl-ether, styrene, and derivative compounds thereof instead of the reactive mesogen compound represented by Formula 1 or 2.

The reactive mesogen compound represented by Formula 1 may include the polymerizable group at both ends thereof such that $A_1$ and $A_2$ corresponding to the core part are arranged between the polymerizable groups. In addition, the reactive mesogen compound represented by Formula 2 may include the polymerizable group at one end thereof. The reactive mesogen compound represented by Formula 2 may include the polymerizable group denoted by "Pc" at one end thereof and the anchoring group denoted by "E" at the other end thereof such that $B_1$ and $B_2$ corresponding to the core part are arranged between the polymerizable group Pc and the anchoring group E.

In one or more exemplary embodiments, $A_1$, $A_2$, $B_1$, and $B_2$ are independently a substituted or unsubstituted aromatic ring having 6 to 30 carbon atoms for forming a ring, a substituted or unsubstituted heteroaromatic ring group having 2 to 30 ring carbon atoms, a substituted or unsubstituted aliphatic ring having 5 to 30 carbon atoms for forming a ring, or a substituted or unsubstituted heteroaliphatic ring having 2 to 30 carbon atoms for forming a ring. A heteroatom in the heterocyclic group may be O, N, or S. In addition, $A_1$, $A_2$, $B_1$, and $B_2$ may be a polycyclic ring, and the polycyclic ring may be a condensed ring formed via the bonding of adjacent rings or a substituent with an adjacent ring.

For example, $A_1$, $A_2$, $B_1$, and $B_2$ are a divalent ring compound, e.g., a substituted or unsubstituted arylene having 6 to 30 carbon atoms for forming a ring, or a substituted or unsubstituted heteroarylene having 2 to 30 carbon atoms for forming a ring. In addition, $A_1$, $A_2$, $B_1$, and $B_2$ are a divalent substituted or unsubstituted cycloalkylene or cycloalkenylene having 5 to 30 carbon atoms for forming a ring or a divalent substituted or unsubstituted heterocycloalkylene or heterocycloalkenylene having 2 to 30 carbon atoms for forming a ring.

In a case that a1 is an integer greater than or equal to 2, $A_1$-$L_1$ may be a repetition of the same group. Plural $A_1$-$L_1$ parts may be a connection of different groups from each other.

In Formulas 1 and 2, $A_1$, $A_2$, $B_1$, and $B_2$ may be independently selected from substituted or unsubstituted cyclic compounds A-1 to A-22 shown below. The "-*" in Formulas of the present disclosure may indicate a bonding site in the compounds.

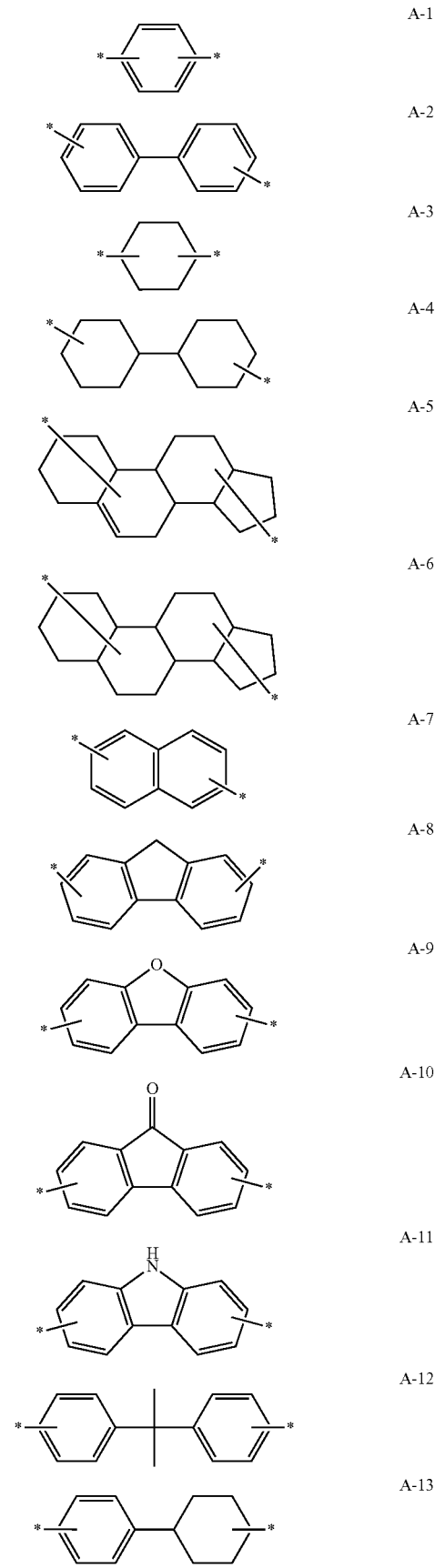

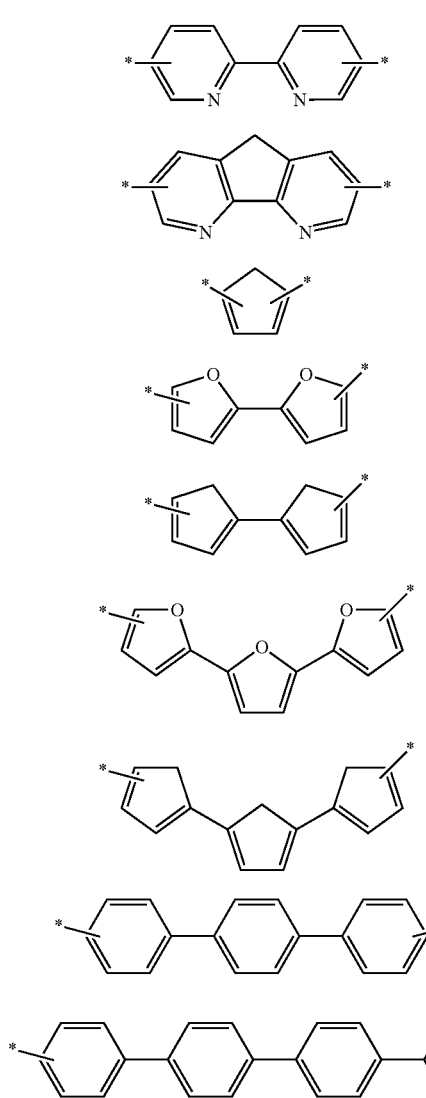

A-14
A-15
A-16
A-17
A-18
A-19
A-20
A-21
A-22

It is also contemplated that $A_1$, $A_2$, $B_1$, and $B_2$ may be independently substituted or unsubstituted by at least one selected from deuterium atom, halogen atom, —OH, —SH, —NH$_2$, —CN, —CF$_3$, —B(OH)$_2$, and —R$^0$(CH$_2$)$_r$R$^1$. It is noted that R$^0$ may be one of —O, —NH, —S, —C=O, and —O—C=O, R$^1$ may be one of —OH, —NH$_2$, —CN, —CF$_3$, —B(OH)$_2$, —SH, and —CH$_3$, and r may be an integer greater than or equal to 1 and smaller than or equal to 12.

In one or more exemplary embodiments, $L_1$ and $L_2$ may be each independently a direct linkage, —O—, —S—, —CO—, —COO—, —OCOO—, —O(CH$_2$)$_{k1}$—, —S(CH$_2$)$_{k1}$—, —O(CF$_2$)$_{k1}$—, —S(CF$_2$)$_{k1}$—, —(CH$_2$)$_{k1}$—, —CF$_2$CH$_2$—, —(CF$_2$)$_{k1}$—, —CH=CH—, —CF=CF—, —C≡C—, —CH=CH—COO—, or —(CH$_2$)$_{k1}$—COO—(CH$_2$)$_{k2}$—O—. It is noted that k1 and k2 may be independently an integer of 0 to 4.

Further, $L_1$ and $L_2$ may be independently a linkage group to connect $A_1$ and $A_2$, which are a core group, or to connect $B_1$ and $B_2$, which are a core group. As another example, $L_1$ and $L_2$ may be independently a linkage group to connect $A_1$ and $A_2$, which are a core group, to the polymerizable group Pa and Pb, which are a terminal reactive group, or to connect $B_1$ and $B_2$, which are a core group, to the polymerizable group Pc and E, which are a terminal reactive group. It is contemplated, however, that $L_1$ and $L_2$ should not be limited to the above-mentioned linkage groups, and the link order of the linkage groups may be modified. For instance, —O(CH$_2$)$_{k1}$— may include —(CH$_2$)$_{k1}$O—. This may be applied to another linkage group.

According to one or more exemplary embodiments, $Z_1$ and $Z_2$ may be each independently a direct linkage, —O—, —S—, —CO—, —COO—, —OCOO—, —O(CH$_2$)$_{m1}$—, —S(CH$_2$)$_{m1}$—, —O(CF$_2$)$_{m1}$—, —S(CF$_2$)$_{m1}$—, —(CH$_2$)$_{m1}$—, —CF$_2$CH$_2$—, —(CF$_2$)$_{m1}$—, —CH=CH—, —CF=CF—, —C≡C—, —CH=CH—COO—, —(CH$_2$)$_{m1}$—COO—, —(CH$_2$)$_{m1}$—COO—(CH$_2$)$_{m2}$—O—, —CH—(S$_p$—Pa)—, —CH$_2$CH—(S$_p$—Pa)—, or —(CH—(S$_p$—Pa)—CH—(S$_p$—Pa))—. In this case, m1 and m2 may be each independently an integer of 0 to 4. In addition, Sp may be a direct linkage or a spacer group, and Pa may be a polymerizable group.

The spacer group may connect the core group and the polymerizable group, or the core group and the anchoring group. For instance, the spacer group may be an alkyl group having 1 to 12 carbon atoms or an alkoxy group having 1 to 12 carbon atoms. In one or more exemplary embodiments, the spacer group may be —(CH$_2$)$_{i1}$—, —(CH$_2$CH$_2$O)$_{i1}$—CH$_2$CH$_2$—, —CH$_2$CH$_2$—S—CH$_2$CH$_2$—, —CH$_2$CH$_2$—NH—CH$_2$CH$_2$—, or —(SiR$^2$R$^3$—O)$_{i1}$—. In this case, R$^2$ and R$^3$ are independently a hydrogen atom or an alkyl group having 1 to 12 carbon atoms. Further, "i1" may be an integer greater than or equal to 1 and less than or equal to 12.

The "E" in Formula 2 may be an anchoring group. For instance, "E" may be a hydrogen bonding group having at least one of a nitrogen atom and an oxygen atom.

In one or more exemplary embodiments, "E" in Formula 2 may be selected from heterocyclic groups or amine groups E-1 to E19 shown below. In E-18 and E-19, n1 and n2 may e each independently an integer of 1 to 12

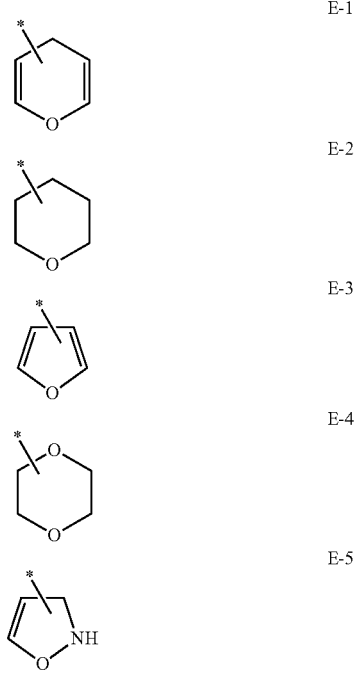

E-1
E-2
E-3
E-4
E-5

-continued

E-6 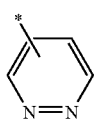

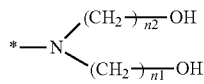 E-18

E-7 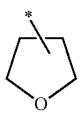

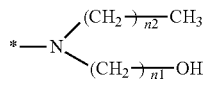 E-19

E-8 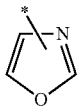

In Formula 1, Pa and Pb may be independently one of P-1 to P-10 shown below. In P-10, "p" may be an integer of 1 to 20. It is noted, however, that Pa and Pb may not be P-10 simultaneously in Formula 1. That is, in the case that Pa is P-10, Pb may be one selected from P-1 to P-9, and, in the case that Pb is P-10, Pa may be one selected from P-1 to P-9.

E-9 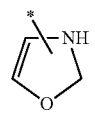

E-10 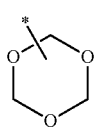

P-1 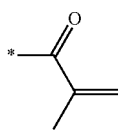

E-11 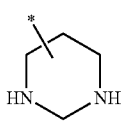

P-2 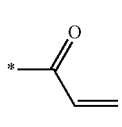

E-12 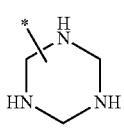

P-3 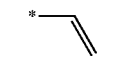

P-4

P-5 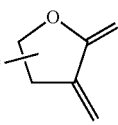

E-13 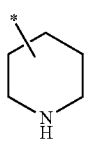

P-6 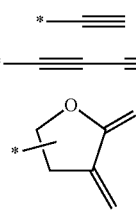

E-14 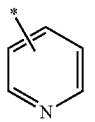

P-7 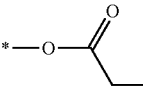

E-15 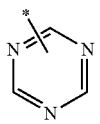

P-8 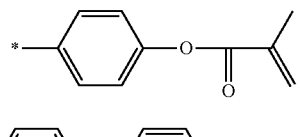

P-9 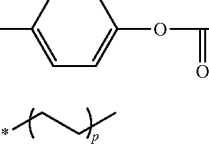

E-16 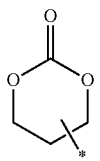

P-10

In addition, Pc shown in Formula 2 may be one selected from P-1 to P-9, shown below.

E-17 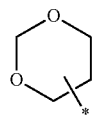

P-1 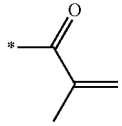

P-2
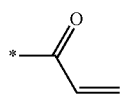
P-3
P-4
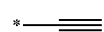
P-5
P-6
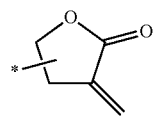
P-7
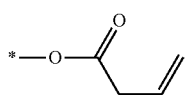
P-8
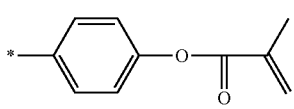
P-9
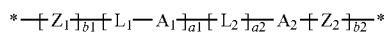
Further,
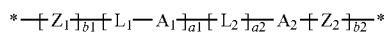
of Formula 1 and
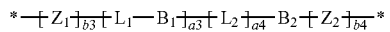
of Formula 2 may be a vertical alignment group aligning liquid crystal compounds.
The reactive mesogen of the first alignment-inducing layer ALN1 may be one selected from the following groups of Compounds 1, e.g., one of (1-1) to (1-10).
Compounds 1
(1-1)
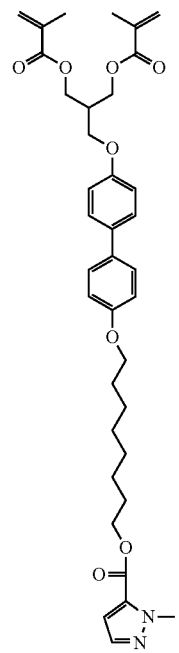
(1-2)
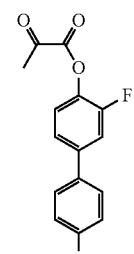

(1-3)
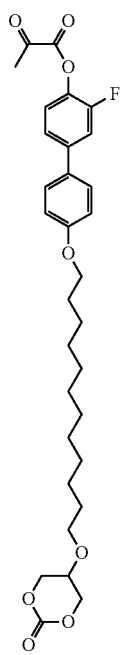
(1-4)
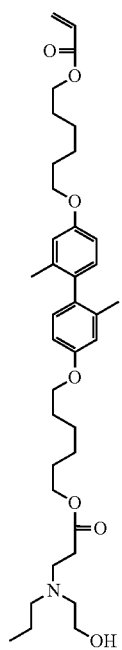
(1-5)
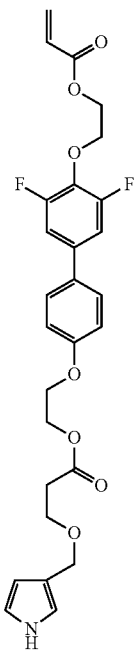
(1-6)
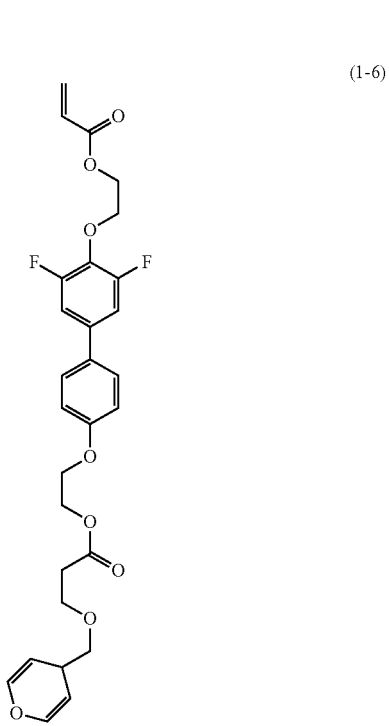

(1-7)
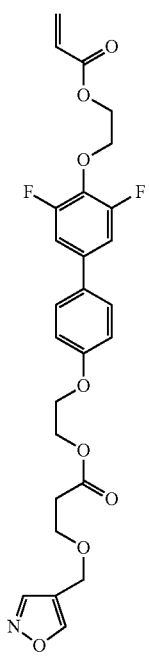
(1-8)
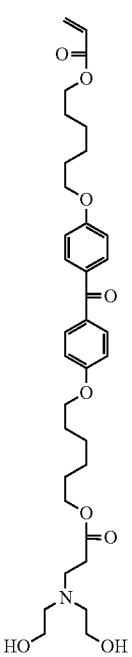
(1-9)
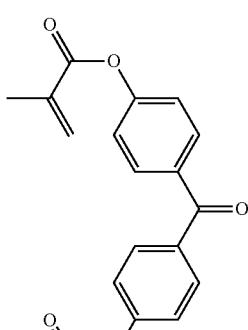
(1-10)
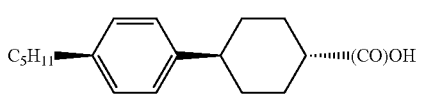
The polymerized reactive mesogen may include at least one of vertical alignment groups in the following Compounds 2, e.g., one of V-1 to V-18, shown below.
Compounds 2
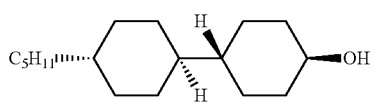

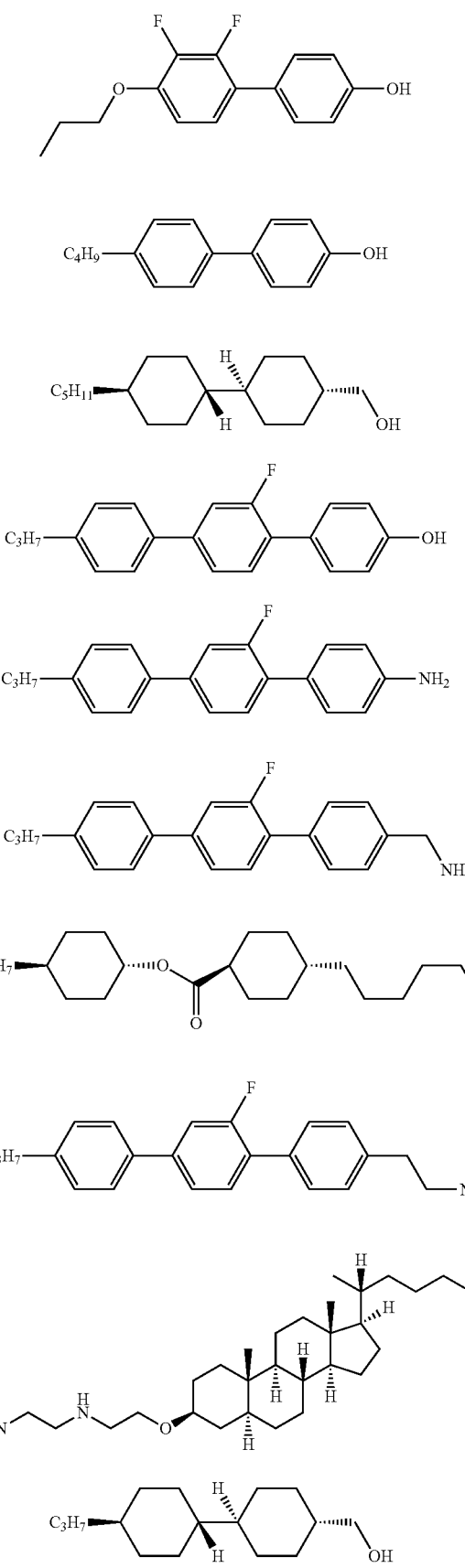
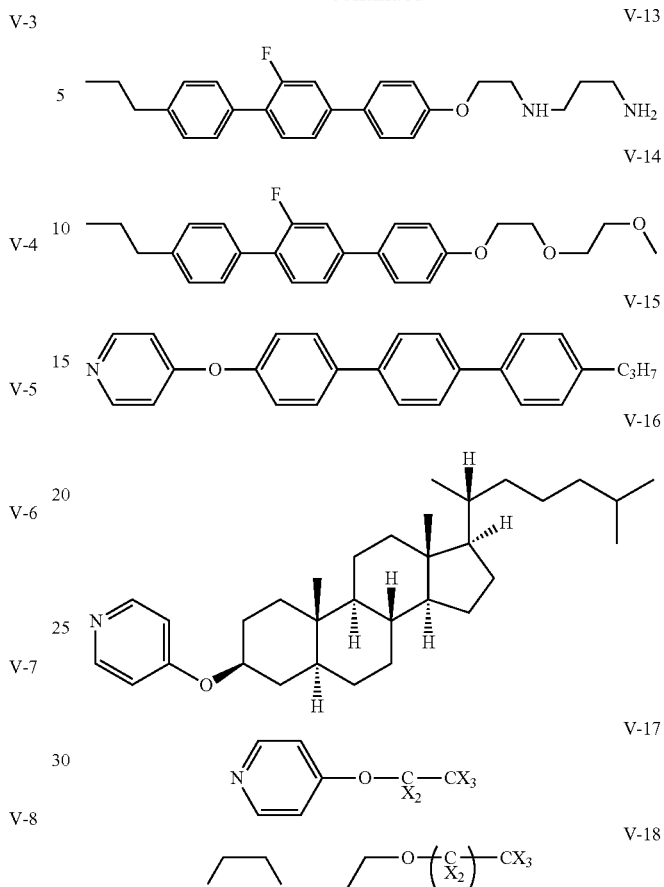

The first alignment-inducing layer ALN1 may be formed by polymerizing the reactive mesogen. The reactive mesogen may be polymerized using ultraviolet light. That is, the polymerizable groups Pa, Pb, and Pc of the reactive mesogen may be polymerizable groups in which a polymerization reaction occurs by ultraviolet light.

According to one or more exemplary embodiments, the reactive mesogen for the first alignment-inducing layer ALN1 may be provided together with the liquid crystal molecules LC of the liquid crystal layer LCL. That is, the reactive mesogen may be provided together with the liquid crystal molecules LC through a liquid crystal dropping process or a liquid crystal injection process. An annealing process may be performed on the reactive mesogen provided together with the liquid crystal molecules LC.

An electric field may be formed between the first substrate SUB1 and the second substrate SUB2 to align the liquid crystal molecules LC, and the ultraviolet light may be radiated to polymerize the reactive mesogen compound. In this case, the liquid crystal molecules LC may be aligned at a determined pre-tilt angle with respect to the first alignment-inducing layer ALN1 and the second alignment-inducing layer ALN2. The determined pre-tilt angle of the liquid crystal molecules LC adjacent to the first alignment-inducing layer ALN1 may be the same as or different from the determined pre-tilt angle of the liquid crystal molecules LC adjacent to the second alignment-inducing layer ALN2.

In the case that the second alignment-inducing layer ALN2 is formed of the polymerized reactive mesogen, the second alignment-inducing layer ALN2 may be formed of derivatives of the compounds represented by Formulae 1 and 2. The second alignment-inducing to layer ALN2 may be formed of the same reactive mesogen as that of the first alignment-inducing layer ALN1. It is also contemplated that the second alignment-inducing layer ALN2 may be formed of a reactive mesogen different from that of the first alignment-inducing layer ALN1. That is, the second alignment-inducing layer ALN2 may be an alignment layer that is formed to include the reactive mesogen having a different chemical structure from that of the reactive mesogen of the first alignment-inducing layer ALN1.

In the case that the first alignment-inducing layer ALN1 and the second alignment-inducing layer ALN2 are formed to include the polymerized reactive mesogen, a manufacturing process of the display device DD may be performed at a lower temperature than that when the alignment layers are formed using polyimide. That is, since the reactive mesogen may be photo-polymerized by ultraviolet light to form the alignment layer, a high temperature curing process is unnecessary. Accordingly, although the optical members are directly formed on the first substrate SUB1 and the second substrate SUB2, the optical members may be prevented (or at least reduced) from being exposed to the high temperature typically utilized in association with formation of an alignment layer including polyimide. In this manner, the optical members may be prevented (or at least reduce) from burning or deteriorating, and, as such, a reliability of the display device DD may be improved.

According to one or more exemplary embodiments, the second alignment-inducing layer ALN2 may include polyimide. The second alignment-inducing layer ALN2 may be a polyimide alignment layer. The polyimide alignment layer may be formed of a polyimide alignment solution containing at least one dianhydride compound selected from the following Compounds 3, e.g., one of AH-1 to AH-3, and at least one diamine compound selected from the following Compounds 4, e.g., one of AM-1 to AM-5. In this case, the diamine compound may include AM-1.

Compounds 3

AH-1
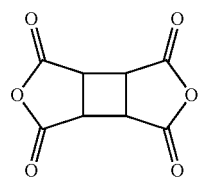

AH-2
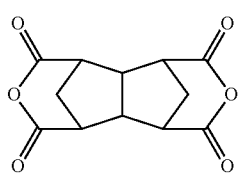

AH-3
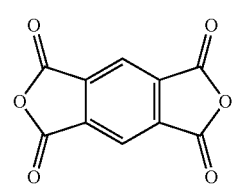

Compounds 4

AM-1
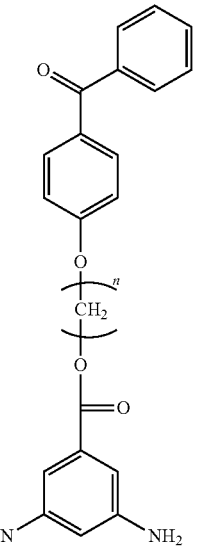

AM-2
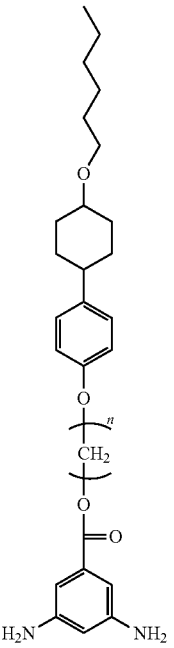

AM-3
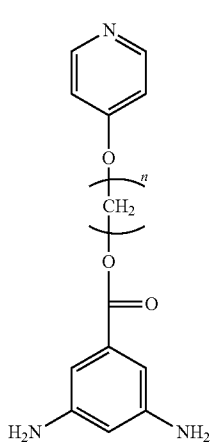

AM-4

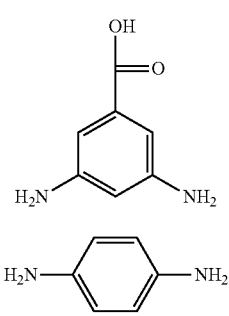

AM-5

In Compounds 4, "n" may be an integer of 1 to 12.

Figure 5A:
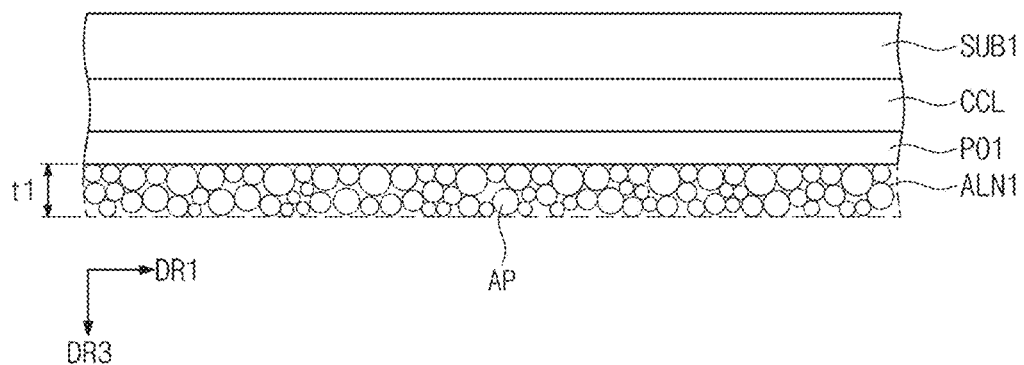
FIG. 5A is a cross-sectional view of a portion of the display device of FIG. 2, according to one or more exemplary embodiments.
Figure 5B:
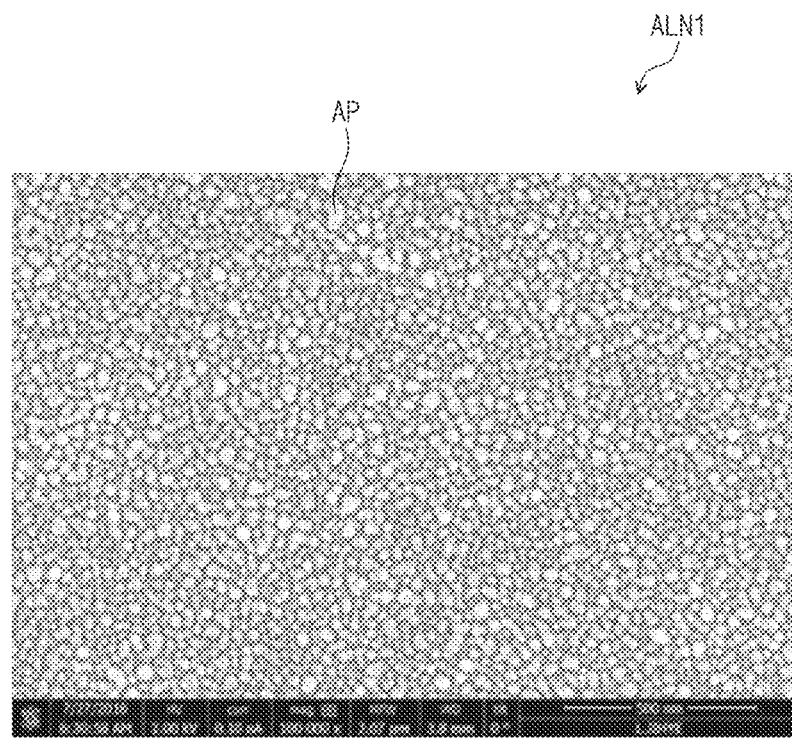
FIG. 5B is an image of an alignment-inducing layer of a display device, according to one or more exemplary embodiments.

An alignment-inducing layer including the polymerized reactive mesogen may include a plurality of protrusions. FIG. 5A is a cross-sectional view of a portion of the display device of FIG. 2, according to one or more exemplary embodiments. That is, FIG. 5A is a cross-sectional view of an alignment-inducing layer including the polymerized reactive mesogen. In FIG. 5A, a portion in which the first alignment-inducing layer ALN1 is formed of the display device DD shown in FIG. 2 is illustrated. FIG. 5B is an image of an alignment-inducing layer of a display device, according to one or more exemplary embodiments. That is, FIG. 5B is a scanning electron microscope (SEM) image of the first alignment-inducing layer ALN1 when viewed in a plan view, e.g., in the third direction DR3.

Referring to FIG. 5A, the first alignment-inducing layer ALN1 may include a plurality of protrusions AP. The protrusions AP may have various sizes and shapes. The protrusions AP may be particles having a circular shape or an oval shape with random size. The protrusions AP may be particles formed by the polymerization reaction of the reactive mesogen. The first alignment-inducing layer ALN1 may be a layer formed by the particles having the random size and being stacked one on another that are formed by the reactive mesogen. For instance, the protrusions AP may be arranged on a plane surface to form a single layer or the protrusions AP with various sizes may be arranged to form plural layers, thereby forming the first alignment-inducing layer ALN1. It is noted that although FIG. 5A schematically shows an exemplary arrangement of the protrusions AP forming the first alignment-inducing layer ALN1, the arrangement of the protrusions AP is not limited thereto or thereby.

As seen in FIG. 5A, the first alignment-inducing layer ALN1 has a thickness t1 corresponding to a maximum thickness of the layer formed by stacking the protrusions AP. The thickness t1 of the first alignment-inducing layer ALN1 may be less than or equal to about 100 nm. For instance, the thickness t1 of the first alignment-inducing layer ALN1 may be in a range greater than or equal to about 20 nm and less than or equal to about 40 nm, e.g., greater than or equal to about 25 nm and less than or equal to about 35 nm. For example, the thickness t1 of the first alignment-inducing layer ALN1 may be in a range greater than or equal to about 20 nm and less than or equal to about 30 nm.

Referring to FIGS. 5A and 5B, the first alignment-inducing layer ALN1 includes the polymerized reactive mesogen. However, in a case that the second alignment-inducing layer ALN2 is formed to include the polymerized reactive mesogen, the second alignment-inducing layer ALN2 may include the protrusions stacked one on another as shown in FIGS. 5A and 5B. In this case, the second alignment-inducing layer ALN2 may have a thickness less than or equal to about 100 nm. For instance, the thickness of the second alignment-inducing layer ALN2 may be in a range greater than or equal to about 20 nm and less than or equal to about 40 nm, e.g., greater than or equal to about 25 nm and less than or equal to about 35 nm, such as greater than or equal to about 20 nm and less than or equal to about 30 nm.

According to one or more exemplary embodiments, in the case that the first alignment-inducing layer ALN1 or the second alignment-inducing layer ALN2 is the alignment layer including polyimide, the thickness of the alignment layer may be greater than about 100 nm. That is, in the case that the first alignment-inducing layer ALN1 or the second alignment-inducing layer ALN2 is the alignment layer including the polymerized reactive mesogen, the thickness of the alignment layer may be smaller than the thickness of the alignment layer when the first alignment-inducing layer ALN1 or the second alignment-inducing layer ALN2 includes polyimide.

Figure 6A:
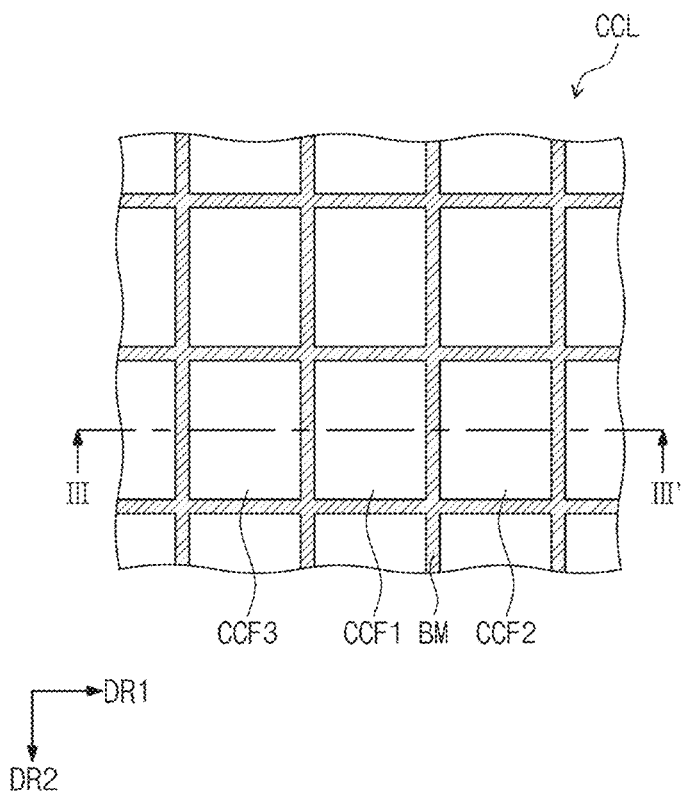
FIG. 6A is a plan view of a color conversion layer of a display device, according to one or more exemplary embodiments
Figure 6B:
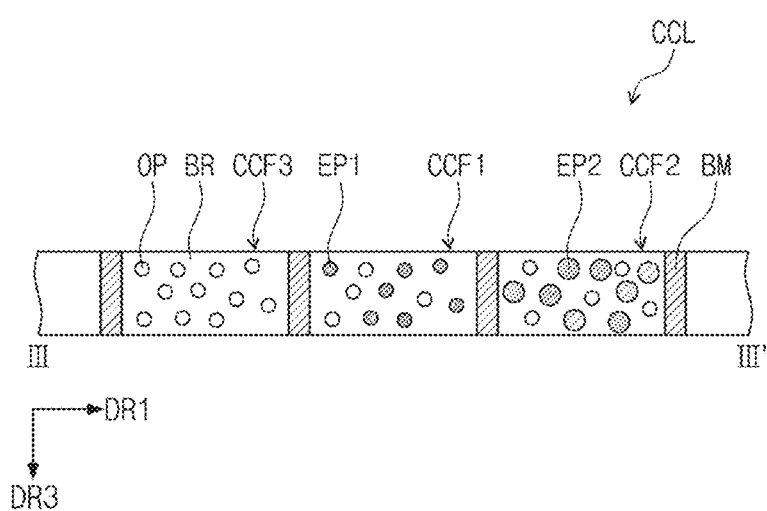
FIG. 6B is a cross-sectional view of the color conversion layer of FIG. 6A taken along sectional line III-III', according to one or more exemplary embodiments.

FIG. 6A is a plan view of a color conversion layer of a display device, according to one or more exemplary embodiments. FIG. 6B is a cross-sectional view of the color conversion layer of FIG. 6A taken along sectional line III-III', according to one or more exemplary embodiments. For instance, FIGS. 6A and 6B show the color conversion layer CCL included in the display device shown in FIG. 2.

With reference to FIGS. 2, 6A, and 6B, the display panel unit DP of the display device DD includes the color conversion layer CCL. The color conversion layer CCL may be disposed on the liquid crystal layer LCL, e.g., may be disposed on the first substrate SUB1. The color conversion layer CCL may include an illuminant that absorbs the first color light provided from the light source unit BLU and emits a light having a different color from the first color. For example, the color conversion layer CCL may include an illuminant that absorbs the first color light and emits the second color light. For instance, the first color light may be the blue light, and the second color light may be the green light or the red light. A maximum absorption wavelength of the second color light may be different from a maximum absorption wavelength of the first color light. For instance, the maximum absorption wavelength of the second color light may be longer than the maximum absorption wavelength of the first color light.

The color conversion layer CCL may include a plurality of conversion parts, e.g., first through third conversion parts CCF1, CCF2, and CCF3, and a light blocking part BM. The first conversion part CCF1, the second conversion part CCF2, and the third conversion part CCF3 are arranged spaced apart from each other on a plane surface. Referring to FIG. 6A, the first conversion part CCF1, the second conversion part CCF2, and the third conversion part CCF3 may be arranged spaced apart from each other on the plane surface defined by the first direction DR1 and the second direction DR2.

Referring to FIG. 6A, the first conversion part CCF1, the second conversion part CCF2, and the third conversion part CCF3 may emit different color lights and may be arranged spaced apart from each other in the first direction DR1. Conversion parts of the color conversion layer CCL that emit the same color light are arranged spaced apart from each other in the second direction DR2. The light blocking part BM may be disposed between conversion parts of the color conversion layer CCL that are arranged spaced apart from each other. The light blocking part BM may be a black matrix. The light blocking part BM may include an organic light blocking material or an inorganic light blocking material including a black pigment or dye. The light blocking part BM may prevent (or at least reduce) light leakage from occurring or separates a boundary between adjacent conversion parts of the color conversion layer CCL.

Although not shown in FIG. 2, at least a portion of the light blocking part BM may be disposed to overlap adjacent conversion parts of the color conversion layer CCL. That is, the light blocking part BM may be disposed to allow at least the portion to overlap with the conversion parts of the color conversion layer CCL that are adjacent to the light blocking part BM in the thickness direction on the plane surface defined by the first direction DR1 and the third direction DR3.

In one or more exemplary embodiments, the color conversion layer CCL may include a first illuminant absorbing the first color light and emitting the second color light and a second illuminant absorbing the first color light and emitting the third color light. The third color light may have a color different from that of the second color light. For instance, the first color light is the blue light, the second color light is the green light, and the third color light is the red light.

Referring to FIG. 6B, the color conversion layer CCL may include the first conversion part CCF1 including the first illuminant EP1, the second conversion part CCF2 including the second illuminant, and the third conversion part CCF3 transmitting the first color light. For instance, the first illuminant EP1 absorbs the first color light, e.g., the blue light, to emit the green light, and the second illuminant EP2 absorbs the first color light, e.g., the blue light, to emit the red light. That is, the first conversion part CCF1 corresponds to a light emitting area emitting the green light, and the second conversion part CCF2 corresponds to a light emitting area emitting the red light. The third conversion part CCF3 may not include the illuminant. The third conversion part CCF3 may transmit the first color light provided from the light source unit BLU (refer to FIG. 2). That is, the third conversion part CCF3 corresponds to the light emitting area emitting the blue light.

With continued reference to FIG. 6B, the first conversion part CCF1, the second conversion part CCF2, and the third conversion part CCF3 may include a base resin BR. The base resin BR may be, but is not limited to, a polymer resin, e.g., an acryl-based resin, an urethane-based resin, a silicon-based resin, an epoxy-based resin, etc. The base resin BR may be a transparent resin.

The first conversion part CCF1, the second conversion part CCF2, and the third conversion part CCF3 may further include scattering particles OP. The scattering particles OP may be $TiO_2$ or silica-based nanoparticles. The scattering particles OP scatter the light emitted from the illuminant to allow the scattered light to be emitted to the outside of the conversion part CCF. In the case that the light transmits through the third conversion part CCF3 without being changed, the scattering particles OP scatter the light provided thereto and emits the scattered to light to the outside of the third conversion part CCF3.

The first illuminant EP1 and the second illuminant EP2 included in the color conversion layer CCL may be a fluorescent substance or a quantum dot. That is, the color conversion layer CCL may include at least one of the fluorescent substance or the quantum dot as the first illuminant EP1 and the second illuminant EP2.

The fluorescent substance used as the first illuminant EP1 and the second illuminant EP2 may be an inorganic fluorescent substance. For instance, the fluorescent substance used as the first illuminant EP1 and the second illuminant EP2 of the display device DD may be a green fluorescent substance or a red fluorescent substance.

The green fluorescent substance may be at least one selected from the group consisting of $YBO_3:Ce^{3+}$, $Tbh^3$, $BaMgAl_{10}O_{17}:Eu^{2+}$, $Mn^{2+}$, $(Sr,Ca,Ba)(Al,Ga)_2S_4:Eu^{2+}$, $ZnS:Cu$, $Al$, $CasMg(SiO_4)_4Cl_2:Eu^{2+}$, $Mn^{2+}$; $Ba_2SiO_4:Eu^{2+}$, $(Ba,Sr)_2SiO_4:Eu^{2+}$, $Ba_2(Mg, Zn)Si_2O_7:Eu^{2+}$, $(Ba,Sr)Al_2O_4:Eu^{2+}$, and $Sr_2Si_3O_8.2SrCl_2:Eu^{2+}$. The red fluorescent substance may be at least one selected from the group consisting of $(Sr,Ca,Ba,Mg)P_2O_7:EU^{2+}$, $Mn^{2+}$, $CaLa_2S_4:Ce^{3+}$, $SrY_2S_4:Eu^{2+}$, $(Ca,Sr)S:Eu^{2+}$, $SrS:Eu$ $Eu^{2+}$, $Y_2O_3:Eu^{3+}$, $Bi^3$; $YVO4:Eu^{3+}$, $Bi^{3+}$, $Y_2O_2S:Eu^{3+}$, $Bi^{3+}$, and $Y_2O_2S:Eu^{3+}$. The fluorescent substances applied to the color conversion layer CCL, however, are not limited to or by the aforementioned examples.

The first illuminant EP1 and the second illuminant EP2 included in the color conversion layer CCL may be the quantum dot. The quantum dot may be selected from a group II-VI compound, a group III-V compound, a group IV-VI compound, a group IV element, a group IV compound, and a combination thereof.

The group II-VI compound may be selected from a binary compound selected from the group consisting of CdSe, CdTe, ZnS, ZnSe, ZnTe, ZnO, HgS, HgSe, HgTe, MgSe, MgS, and a mixture thereof, a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof, and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The group III-V compound may be selected from a binary compound selected from the group consisting of GaN, GaP, GaAs, GaSb, AlN, AlP, AlAs, AlSb, InN, InP, InAs, InSb, and a mixture thereof, a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof, and a quaternary compound selected from the group consisting of GaAlNAs, GaANSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

The group IV-VI compound may be selected from a binary compound selected from the group consisting of SnS, SnSe, SnTe, PbS, PbSe, PbTe, and a mixture thereof, a ternary compound selected from the group consisting of SnSeS, SnSeTe, SnSTe, PbSeS, PbSeTe, PbSTe, SnPbS, SnPbSe, SnPbTe, and a mixture thereof, and a quaternary compound selected from the group consisting of SnPbSSe, SnPbSeTe, SnPbSTe, and a mixture thereof.

The group IV element may be selected from the group consisting of Si, Ge, and a mixture thereof. The group IV compound may be a binary compound selected from the group consisting of SiC, SiGe, and a mixture thereof.

The binary compound, the ternary compound, or the quaternary compound may exist in the particles at a uniform concentration or may exist in the same particle after being to divided into plural areas having different concentrations.

The quantum dot may have a core-shell structure including a core and a shell surrounding the core. In addition, the quantum dot may have a core-shell structure in which one quantum dot surrounds another quantum dot. An interface between the core and the shell may have a concentration gradient in which a concentration of elements existing in the shell is lowered as a distance from a center of the shell decreases.

The quantum dot may be a particle with a nanometer-scale size. The quantum dot may have a full width of half maximum (FWHM) of the light emitting wavelength spectrum, which is about 45 nm or less, e.g., about 40 nm or less, such as about 30 nm or less, and a color purity or a color reproducibility may be improved in the aforementioned ranges. In addition, since the light emitted through the quantum dot travels in all directions, an optical viewing angle may be improved.

A shape of the quantum dot is limited to a specific shape. For instance, the quantum dot may have a variety of shapes, e.g., a globular shape, a pyramid shape, a multi-arm shape, a cubic nano-particle, a nano-tube shape, a nano-wire shape, a nano-fabric shape, a nanoplate-shaped particle, etc.

In one or more exemplary embodiments, the color of the light emitted from the quantum dot may be changed in accordance with the particle size. In the case that the first illuminant EP1 and the second illuminant EP2 are the quantum dot, the particle size of the first illuminant EP1 and the particle size of the second illuminant EP2 may be different from each other. For instance, the particle size of the first illuminant EP1 may be smaller than the particle size of the second illuminant EP2. In this case, the first illuminant EP1 emits a light having a shorter wavelength than that of the second illuminant EP2.

Adverting back to FIG. 2, the display device DD may include the first polarizing layer PO1 and the second polarizing layer PO2. The display panel unit DP may include the first polarizing layer PO1 having a polarizing axis in the first direction DR1 and the second polarizing layer PO2 having a polarizing axis in the second direction DR2 substantially perpendicular to the first direction DR1.

At least one of the first polarizing layer PO1 and the second polarizing layer PO2 may be disposed between the first substrate SUB1 and the second substrate SUB2. That is, at least one of the first polarizing layer PO1 and the second polarizing layer PO2 may be an in-cell type polarizing layer in which at least one of the first polarizing layer PO1 and the second polarizing layer PO2 is disposed between the first substrate SUB1 and the second substrate SUB2 that face each other. It is contemplated, however, that at least one of the first polarizing layer PO1 and the second polarizing layer PO2 may be on-cell type polarizing layer disposed on an outer surface the first substrate SUB1 or the second substrate SUB2, e.g., a first surface opposing a second surface that faces the liquid crystal layer LCL.

As seen in FIG. 2, the first polarizing layer PO1 is disposed between the first substrate SUB1 and the second substrate SUB2, and the second polarizing layer PO2 is disposed between the light source unit BLU and the second substrate SUB2. That is, FIG. 2 shows the in-cell type polarizing layer as the first polarizing layer PO1 of the display device DD, but the second polarizing layer PO2 may be disposed between the first substrate SUB1 and the second substrate SUB2 according to embodiments.

In one or more exemplary embodiments, the first polarizing layer PO1 may be disposed between the first alignment-inducing layer ALN1 and the color conversion layer CCL.

According to one or more exemplary embodiments, the first polarizing layer PO1 transmits the light vibrating in a direction parallel to the polarizing axis of the first polarizing layer PO1, and the second polarizing layer PO2 transmits the light vibrating in a direction parallel to the polarizing axis of the second polarizing layer PO2 and perpendicular to the polarizing axis of the first polarizing layer PO1.

The first polarizing layer PO1 or the second polarizing layer PO2 may be a coating type polarizing layer or a polarizing layer formed by a deposition process. The first polarizing layer PO1 or the second polarizing layer PO2 may be formed by coating a material including a dichroic dye and a liquid crystal compound. As another example, the first polarizing layer PO1 or the second polarizing layer PO2 may be a wire-grid-type polarizing layer.

It is contemplated, however, that the first polarizing layer PO1 or the second polarizing layer PO2 may be a film-type polarizing member. For instance, in a case that the first polarizing layer PO1 or the second polarizing layer PO2 is disposed on an upper surface of the first substrate SUB1 or a lower surface of the second substrate SUB2 rather than the in-cell type polarizing layer, the first polarizing layer PO1 or the second polarizing layer PO2 may be attached to the first substrate SUB1 or the second substrate SUB2 after being separately manufactured. In other words, at least one of the first polarizing layer PO1 and the second polarizing layer PO2 may be a modular component.

As seen in FIG. 2, the color conversion layer CCL may be directly disposed on the first substrate SUB1. The expression "the color conversion layer CCL may be directly disposed on the first substrate SUB1" means that the color conversion layer CCL is disposed on the first substrate SUB1 without using additional adhesive member. In FIG. 2, the color conversion layer CCL may be directly disposed on the first substrate SUB1 without using the adhesive member. That is, the color conversion layer CCL may be formed on the first substrate SUB1 using a photoresist process.

According to one or more exemplary embodiments, the display device DD may be manufactured by providing the first substrate SUB1 on which the color conversion layer CCL and the first polarizing layer PO1 are disposed, providing the second substrate SUB2 on which the second polarizing layer PO2 and the second alignment-inducing layer ALN2 are disposed, coupling the first substrate SUB1 and the second substrate SUB2, and providing the liquid crystal molecules LC and the reactive mesogen between the first substrate SUB1 and the second substrate SUB2 to form the first alignment-inducing layer ALN1 including the reactive mesogen.

The first alignment-inducing layer ALN1 may, in one or more exemplary embodiments, be formed after the color conversion layer CCL and the first polarizing layer PO1 are provided to the first substrate SUB1. The first alignment-inducing layer ALN1 may be formed by radiating ultraviolet light to the reactive mesogen as described above instead of the polyimide alignment layer, and, as such, a high temperature process typically used to form an alignment-inducing layer may be omitted in the manufacturing process of the display device DD. Accordingly, although the color conversion layer CCL and the first polarizing layer PO1 are provided before the first alignment-inducing layer ALN1 is formed, the color conversion layer CCL and the first polarizing layer PO1 are not exposed to the aforementioned high temperature process when the first alignment-inducing layer ALN1 is formed. In this manner, the color conversion layer CCL and the first polarizing layer PO1 may be prevented (or at least reduced) from being deformed since the high temperature process is omitted.

That is, since the first alignment-inducing layer ALN1 disposed adjacent to the color conversion layer CCL of the display device DD is formed to include the polymerized reactive mesogen, the color conversion layer CCL may be prevented (or at least reduced) from being exposed to the high temperature process during the manufacturing process of the display device DD. Accordingly, a light emitting maintaining rate of the color conversion layer CCL of the display device DD, in which the first alignment-inducing layer ALN1 is formed to include the polymerized reactive mesogen, increases, and, as such, reliability of the display quality of the display device DD may be improved.

In addition, since the first alignment-inducing layer ALN1 and the second alignment-inducing layer ALN2 may be formed to include the polymerized reactive mesogen without including polyimide, the high temperature process typically used to form alignment layers is omitted, and, as such, optical members including the color conversion layer CCL may be prevented (or at least reduced) from burning or deteriorating. In this manner, the high temperature process typically used to cure the polyimide alignment layer may be omitted from the manufacturing process of the display device DD, and, as such, reliability of the display device DD may be improved. In other words, since the first alignment-inducing layer ALN1 disposed adjacent to the color conversion layer CCL of the display device DD is formed to include the polymerized reactive mesogen instead of polyimide, the reliability and light efficiency of the color conversion layer CCL may be improved.

A display device according to one or more exemplary embodiments will now be described with reference to FIGS. 7 to 14. To avoid obscuring exemplary embodiments described herein, primarily different features of the display device of FIGS. 7 to 14 from the display device DD of FIGS. 1 to 6B will be described.

Figure 7:
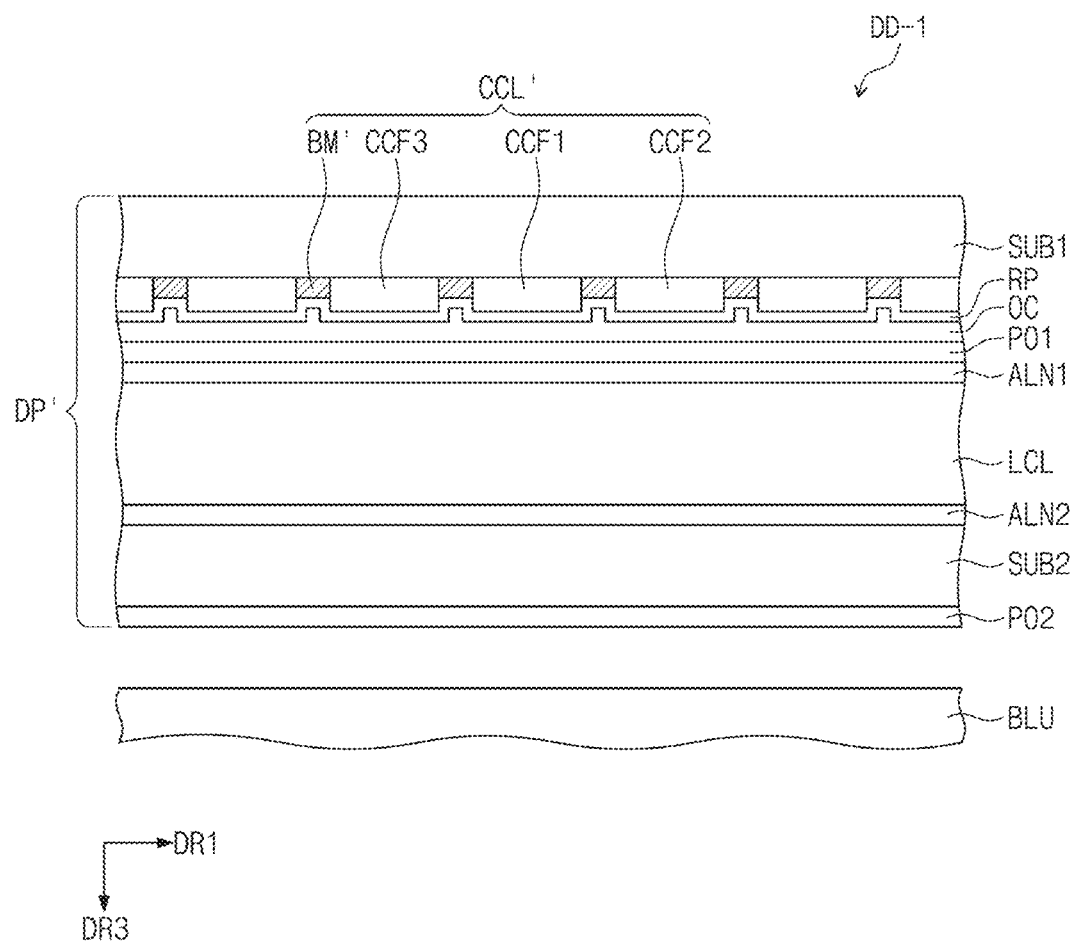
FIG. 7 is a cross-sectional view of a display device, according to one or more exemplary embodiments.
Figure 10:
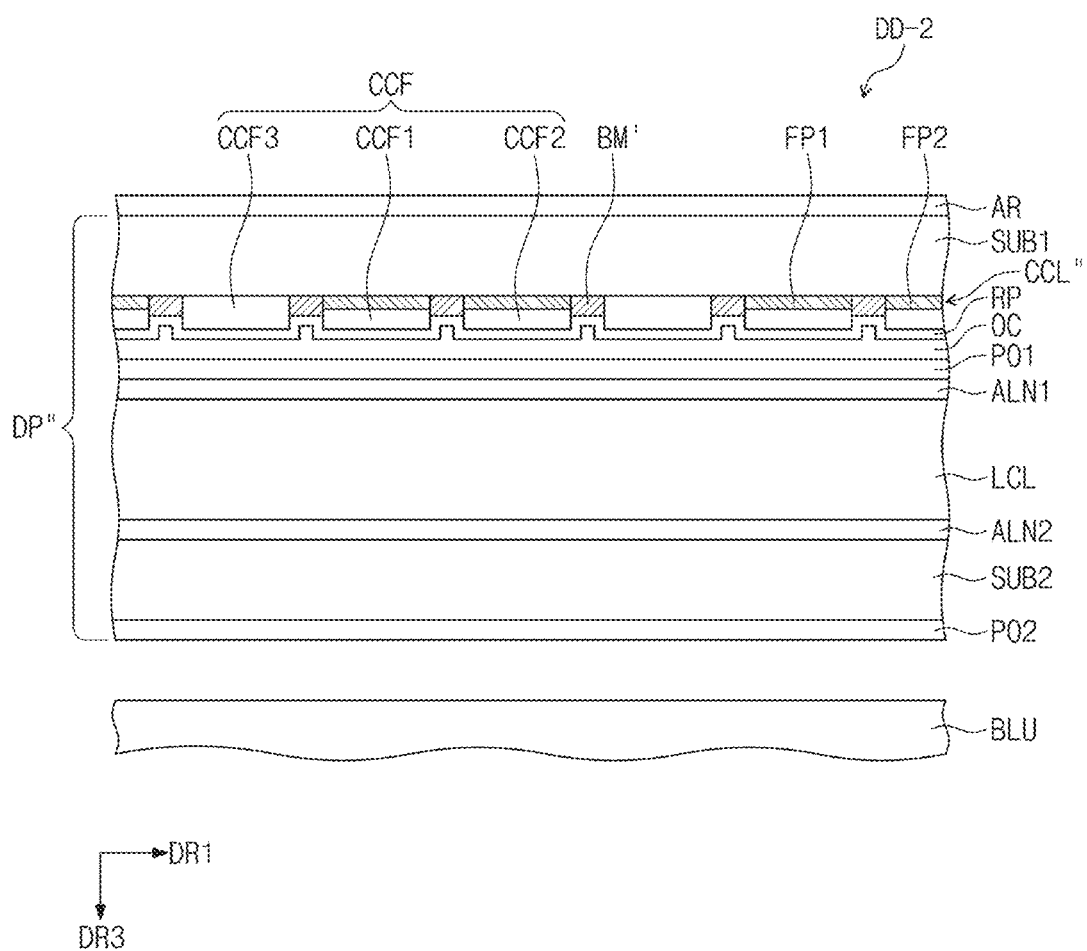
FIG. 10 is a cross-sectional view of a display device, according to one or more exemplary embodiments.
Figure 11:
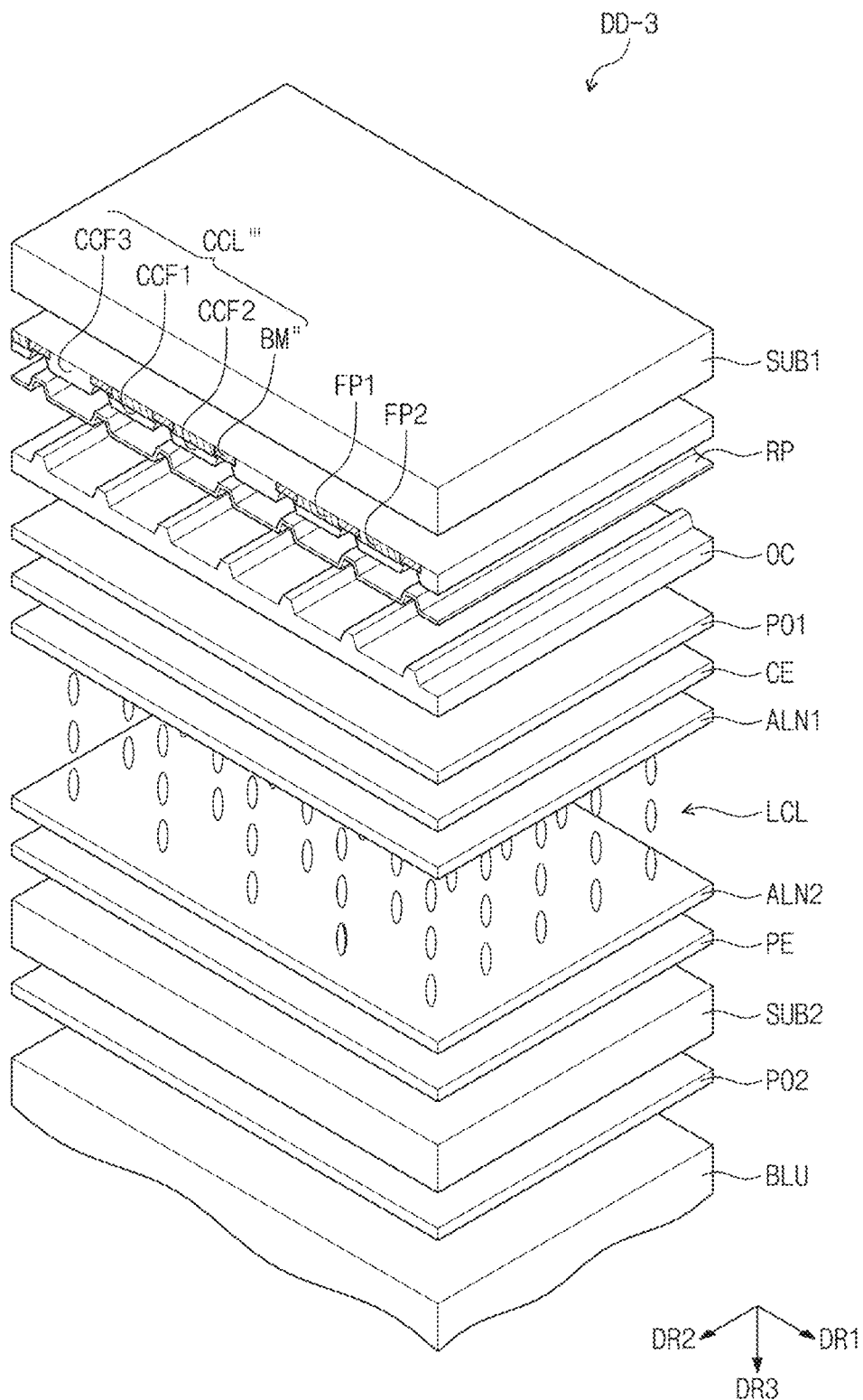
FIG. 11 is an exploded perspective view of a display device, according to one or more exemplary embodiments.
Figure 12:
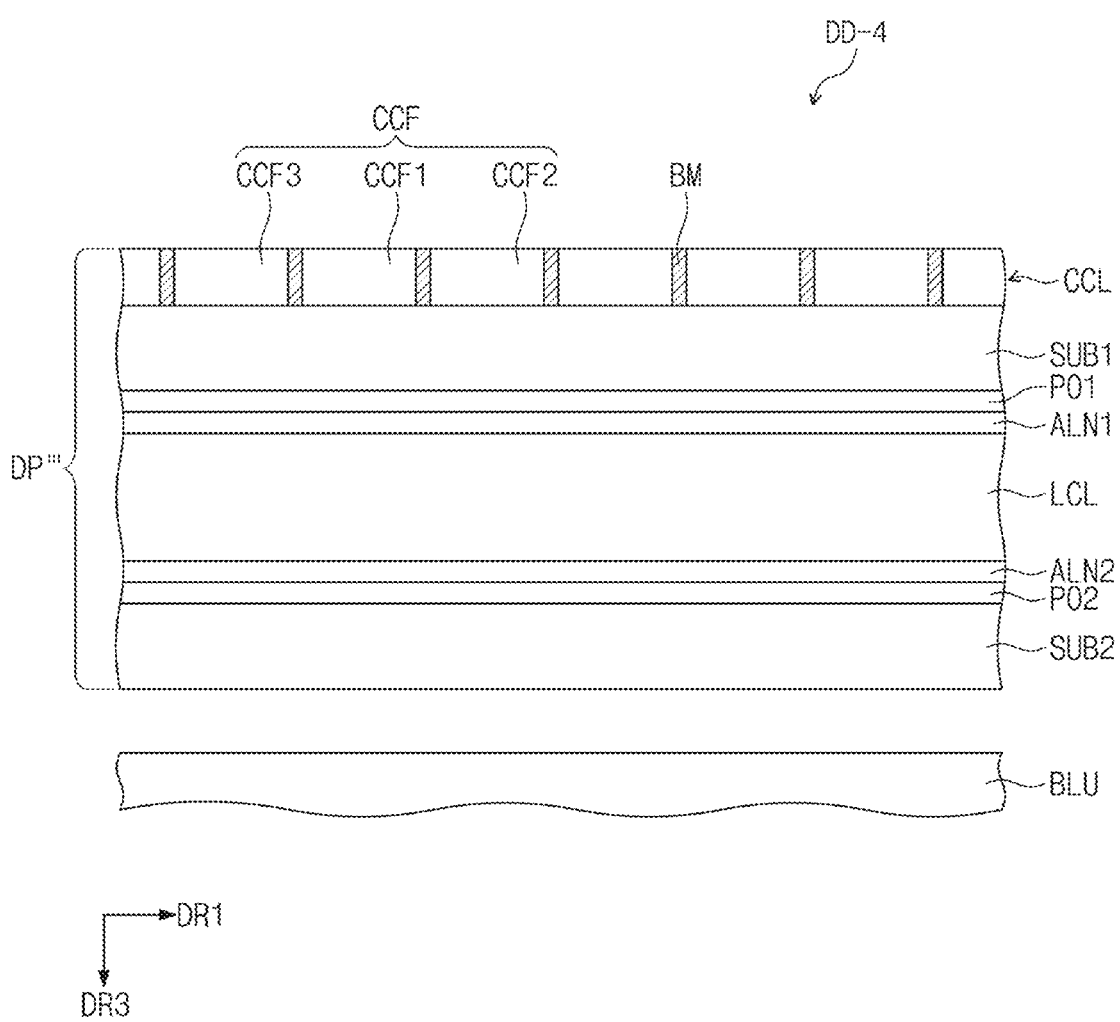
FIGS. 12, 13, and 14 are cross-sectional views of a display device, according to one or more exemplary embodiments.
Figure 13:
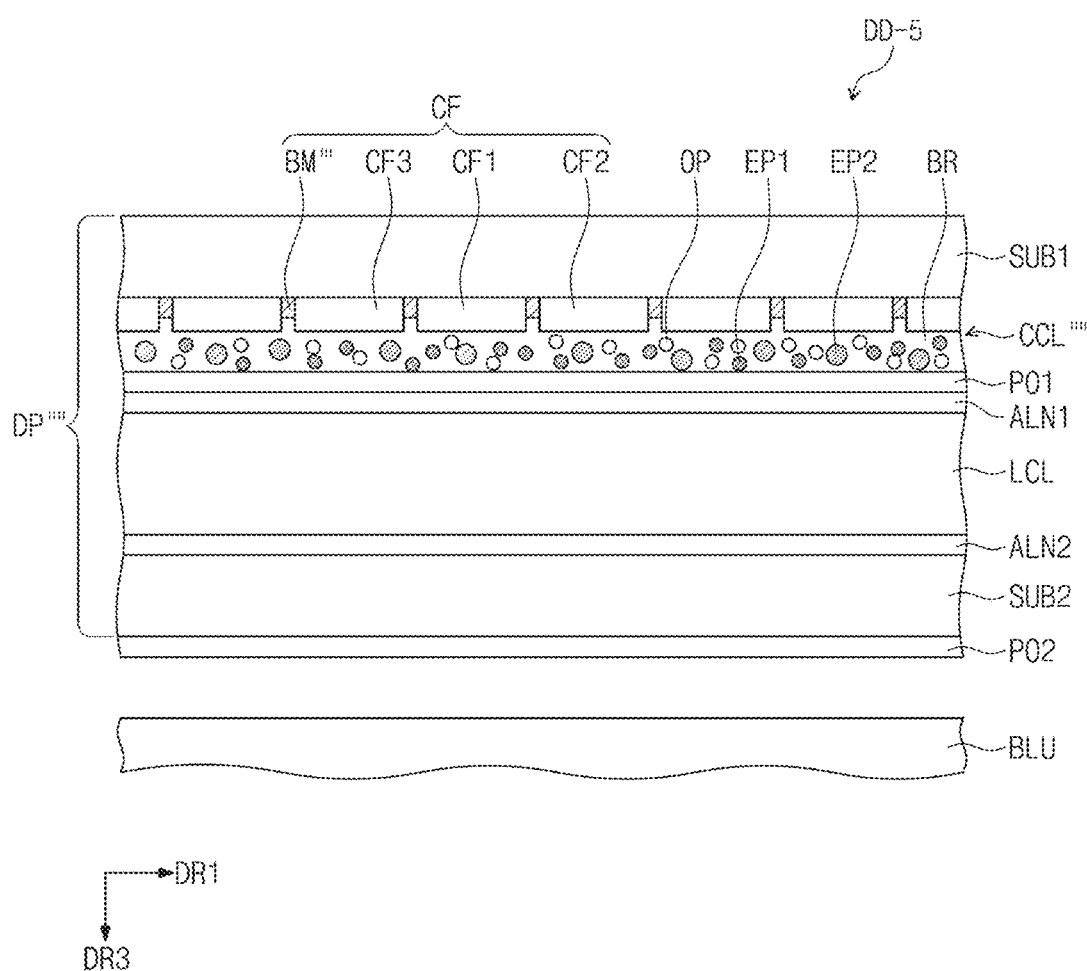
Figure 14:
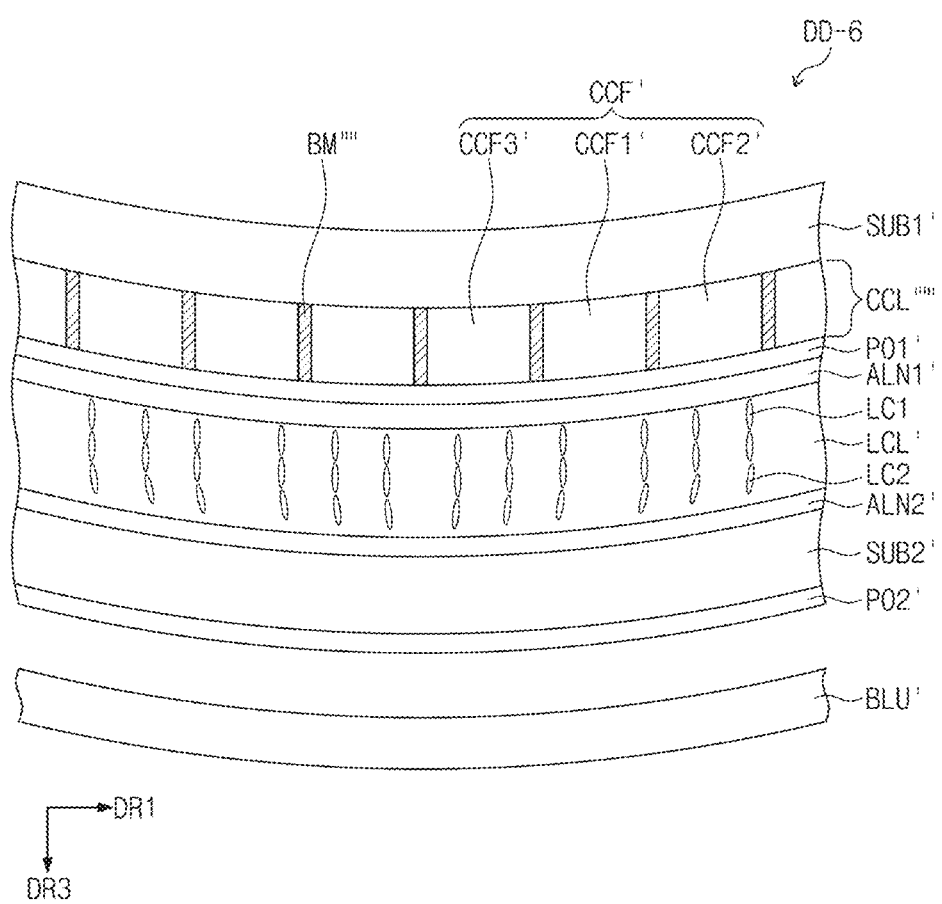

FIG. 7 is a cross-sectional view of a display device, according to one or more exemplary embodiments. FIG. 10 is a cross-sectional view of a display device, according to one or more exemplary embodiments. FIG. 11 is an exploded perspective view of a display device, according to one or more exemplary embodiments. FIGS. 12, 13, and 14 are cross-sectional views of a display device, according to one or more exemplary embodiments. In FIGS. 7 and 10 through 14, the same or similar reference numerals denote the same or similar elements as in FIG. 2, and, as such, detailed descriptions of the same elements will be omitted.

Referring to FIG. 7, the display device DD-1 includes a light source unit BLU and a display panel unit DP' disposed on the light source unit BLU. The display panel unit DP' includes a first substrate SUB1, a second substrate SUB2 facing the first substrate SUB1, a first alignment-inducing layer ALN1, a second alignment-inducing layer ALN2 facing the first alignment-inducing layer ALN1, and a color conversion layer CCL'. The display device DD-1 further includes a reflective layer RP when compared to the display device DD shown in FIG. 2.

The display panel unit DP' of display device DD-1 may include the first alignment-inducing layer ALN1, the first polarizing layer PO1, the reflective layer RP, and the first substrate SUB1, which are sequentially stacked on the liquid crystal layer LCL. In addition, the display panel unit DP' may include the second alignment-inducing layer ALN2, the second substrate SUB2, and the second polarizing layer PO2, which are sequentially stacked on a lower surface of the liquid crystal layer LCL toward the light source unit BLU.

The color conversion layer CCL' may include first conversion part CCF1, second conversion part CCF2, and third conversion part CCF3, as well as include a light blocking part BM' disposed between the first conversion part CCF1, the second conversion part CCF2, and the third conversion part CCF3. The light blocking part BM' may have a smaller thickness in the third direction DR3 than the light blocking part BM of FIG. 2.

The reflective layer RP may be disposed between the color conversion layer CCL' and the liquid crystal layer LCL. The reflective layer RP transmits the first color light and reflects the second and third color lights. The reflective layer RP may be, but is not limited to, a selective transmission-reflection layer. In one or more exemplary embodiments, the reflective layer RP transmits the first color light provided from the light source unit BLU and reflects the second and third lights emitted from the conversion parts of the color conversion layer CCL' and traveling downward in the display panel unit DP' such that the second and third lights travel upward in the display panel unit DP', as will become more apparent below. The reflective layer RP may have a single-layer structure or a multi-layer structure of insulating layers.

Figure 8:
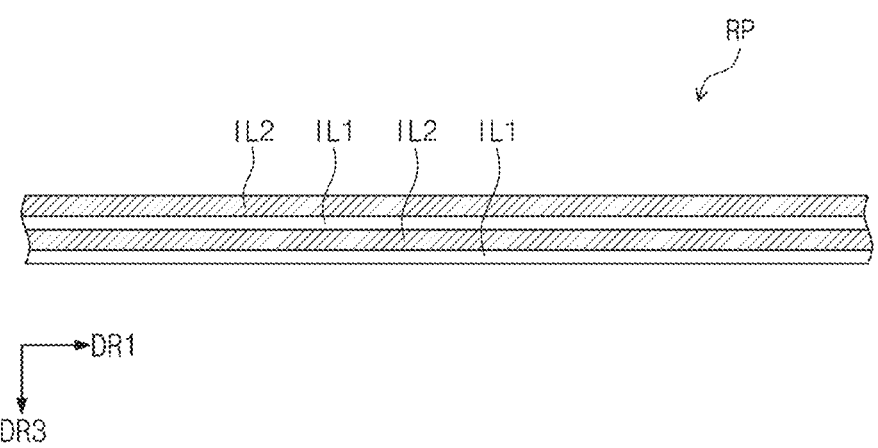
FIG. 8 is a cross-sectional view of a reflective layer of a display device, according to one or more exemplary embodiments.

FIG. 8 is a cross-sectional view of a reflective layer of a display device, according to one or more exemplary embodiments. For instance, FIG. 8 is a cross-sectional view showing the reflective layer RP of the display device DD-1. It is noted that FIG. 8 shows the reflective layer RP configured including a plurality of insulating layers. A range of transmission and reflection wavelengths of the reflective layer RP including the insulating layers is determined depending on a difference in refractive indexes between the insulating layers, a thickness of each insulating layer, and the number of the insulating layers.

As seen in FIG. 8, the reflective layer RP may include a first insulating layer IL1 and a second insulating layer IL2 having a refractive index different from that of the first insulating layer IL1. The reflective layer RP may include at least one first insulating layer IL1 and at least one second insulating layer IL2. Each of the first insulating layer IL1 and the second insulating layer IL2 may be provided in a plural number, and the first insulating layers IL1 may be alternately stacked with the second insulating layers IL2.

For instance, a high-refractive index layer having a relatively high refractive index may include a metal oxide material. For example, the high-refractive index layer may include at least one of $TiO_x$, $TaO_x$, $HfO_x$, and $ZrO_x$. In addition, a low-refractive index layer having a relatively low refractive index may include $SiO_x$, or $SiCO_x$. The reflective layer RP may be formed by alternately depositing $SiN_x$ and $SiO_x$, in sequence. It is noted, however, that materials for the first insulating layer IL1 and the second insulating layer IL2 are not limited to or by the aforementioned materials.

The reflective layer RP may be disposed to cover exposed portions of the first conversion part CCF1, the second conversional part CCF2, and the third conversion part CCF3 of the color conversion layer CCL'. The reflective layer RP may be disposed on the first conversion part CCF1, the second conversional part CCF2, and the third conversion part CCF3 and the light blocking part BM'. For instance, the reflective layer RP may be disposed between the color conversion layer CCL' and the first polarizing layer PO1. The reflective layer RP may serve as a protective layer protecting the color conversion layer CCL'.

Adverting back to FIG. 7, the reflective layer RP may be arranged along concave-convex portions defined by the first conversion part CCF1, the second conversional part CCF2, and the third conversion part CCF3 and the light blocking part BM. That is, the reflective layer RP may be arranged along one surface of the first conversion part CCF1, the second conversional part CCF2, and the third conversion part CCF3 and the light blocking part BM' to provide a concave-convex portion. A planarization layer OC may be disposed on the reflective layer RP. The planarization layer OC may be disposed between the reflective layer RP and the first polarizing layer PO1 to fill the concave-convex portions of the reflective layer RP. The planarization layer OC may serve as a supporter supporting the first polarizing layer PO1.

Figure 9:
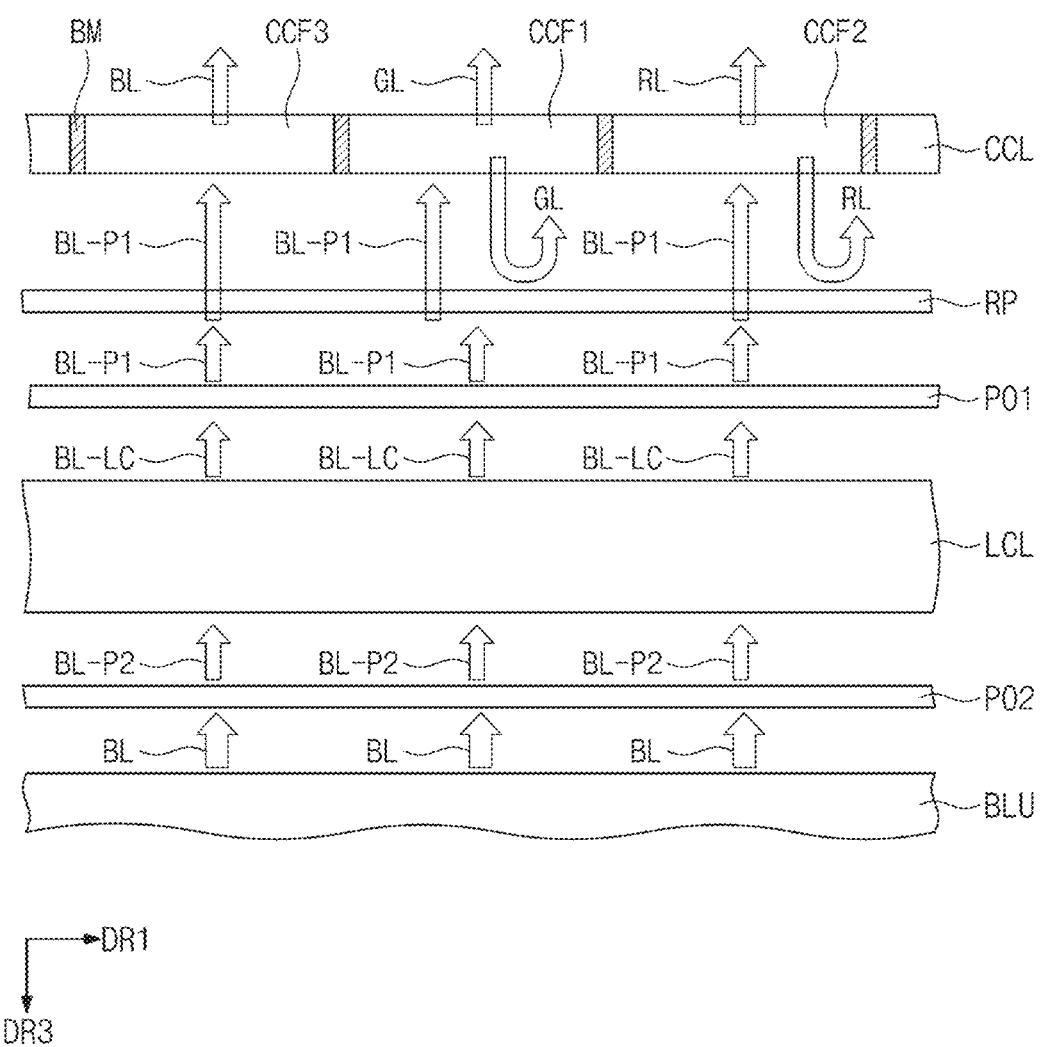
FIG. 9 illustrates light propagating through optical members of a display device, according to one or more exemplary embodiments.

FIG. 9 illustrates light propagating through optical members of a display device, according to one or more exemplary embodiments. The optical members include the first polarizing layer PO1, the second polarizing layer PO2, the liquid crystal layer LCL, the reflective layer RP, and the color conversion layer CCL.

The blue light BL emitted from the light source unit BLU is provided to the second polarizing layer PO2 disposed on the light source unit BLU. The blue light BL becomes a first blue light BL-P2 polarized and vibrated in one direction while passing through the second polarizing layer PO2. The direction in which the polarized first blue light BL-P2 vibrates may be changed while the polarized first blue light BL-P2 passes through the liquid crystal layer LCL. For instance, a transmission light BL-LC exiting from the liquid crystal layer LCL may vibrate in a direction substantially perpendicular to the direction in which the first blue light BL-P2 vibrates. The transmission light BL-LC may be converted into a second blue light BL-P1 vibrating in the direction substantially perpendicular to the direction in which the first blue light BL-P2 by passing through the first polarizing layer PO1.

The first polarizing layer PO1 having the polarizing axis perpendicular to the polarizing axis of the second polarizing layer PO2 transmits the second blue light BL-P1 to provide the second blue light BL-P1 to the reflective layer RP. The second blue light BL-P1 is provided to the color conversion layer CCL after passing through the reflective layer RP.

The color conversion layer CCL includes the first conversion part CCF1 absorbing the blue light to emit the green light, the second conversion part CCF2 absorbing the blue light to emit the red light, and the third conversion part CCF3 transmitting the blue light.

The second blue light BL-P1 provided to the first conversion part CCF1 may be converted to the green light GL. The green light GL may exits from the first conversion part CCF1. A portion, which exits through a lower surface of the color conversion layer CCL, of the green light GL may exit to the outside of the first conversion part CCF1 after being reflected by the reflective layer RP. That is, the green light GL reflected by the reflective layer RP may exit to the outside through an upper surface of the color conversion layer CCL.

The second blue light BL-P1 provided to the second conversion part CCF2 may be converted to the red light RL. The red light RL exits from the second conversion part CCF2. A portion, which exits through the lower surface of the color conversion layer CCL, of the red light RL may exit to the outside of the second conversion part CCF2 after being reflected by the reflective layer RP. That is, the red light RL reflected by the reflective layer RP may exit to the outside through the upper surface of the color conversion layer CCL.

The third conversion part CCF3 transmits the second blue light BL-P1. That is, the reflective layer RP included in the display device DD-1 may be the selective transmission-reflection layer.

According to one or more exemplary embodiments, the first alignment-inducing layer ALN1 may include the polymerized reactive mesogen. In addition, the second alignment-inducing layer ALN2 may include the polymerized reactive mesogen or the alignment layer including polyimide. As another example, the second alignment-inducing layer ALN2 may include both the polymerized reactive mesogen and polyimide.

FIG. 10 is a cross-sectional view of a display device, according to one or more exemplary embodiments. The display device DD-2 shown in FIG. 10 may further include optical filter layers FP1 and FP2 when compared with the display devices DD and DD-1 shown in FIGS. 2 and 7. In addition, the display device DD-2 may further include an anti-reflective layer AR when compared with the display devices DD and DD-1 shown in FIGS. 2 and 7.

The optical filter layers FP1 and FP2 may be disposed on the color conversion layer CCL". The optical filter layers FP1 and FP2 are disposed on the color conversion layer CCL" to block the first color light and transmit the second and third color lights. That is, the optical filter layers FP1 and FP2 may block the blue light and may transmit the green and red lights. The optical filter layers FP1 and FP2 may be implemented with a single layer or plural layers stacked one on another. For instance, the optical filter layers FP1 and FP2 may be implemented as a single layer including a material absorbing the blue light or with plural layers of a low-refractive index layer and a high-refractive index layer stacked on the low-refractive index layer as the reflective layer RP. In one or more exemplary embodiments, the optical filter layers FP1 and FP2 may include dye or pigment to block the light having a specific wavelength. For instance, the optical filter layers FP1 and FP2 may be a yellow color filter layer that absorbs the blue light to block the blue light.

The optical filter layers FP1 and FP2 may include a first optical filter layer FP1 disposed on the first conversion part CCF1, and a second optical filter layer FP2 disposed on the second conversion part CCF2. The first optical filter layer FP1 blocks the blue light and transmits the green light. The second optical filter layer FP2 blocks the blue light and transmits the red light.

The first optical filter layer FP1 disposed on the first conversion part CCF1 may include a green pigment and at least one of the fluorescent substance and the quantum dot, which emit the green light. In addition, the first optical filter layer FP1 may include the fluorescent substance or quantum dot emitting the green light and the fluorescent substance or quantum dot emitting the red light.

The second optical filter layer FP2 disposed on the second conversion part CCF2 may include a red pigment and at least one of the fluorescent substance and the quantum dot, which emit the red light. In addition, the second optical filter layer FP2 may include the fluorescent substance or quantum dot emitting the red light and the fluorescent substance or to quantum dot emitting the green light.

The anti-reflective layer AR may be disposed on the first substrate SUB1. For instance, the anti-reflective layer AR may be disposed at an uppermost position of the display panel unit DP", e.g., on the uppermost surface of the first substrate SUB1. The anti-reflective layer AR may block external light traveling to the display panel unit DP" from outside of the display panel unit DP". The anti-reflective layer AR may block blue light among the external light traveling to the display panel unit DP" from the outside of the display panel unit DP".

According to one or more exemplary embodiments, the first alignment-inducing layer ALN1 may include the polymerized reactive mesogen. In addition, the second alignment-inducing layer ALN2 may include the polymerized reactive mesogen or the alignment layer including polyimide. As another example, the second alignment-inducing layer ALN2 may include both the polymerized reactive mesogen and polyimide.

FIG. 11 is an exploded perspective view of a display device, according to one or more exemplary embodiments. The display device DD-3 of FIG. 11 has a similar structure and function as the display device DD-2 of FIG. 10, except that the anti-reflective layer AR is omitted in the display device DD-3 and the light blocking part BM" of the color conversion layer CCL'" may have a greater width in the first direction DR1 than the light blocking part BM of FIGS. 2, 7, and 10, as will become more apparent below.

The display device DD-3 may include a first alignment-inducing layer ALN1, a common electrode CE, a first polarizing layer PO1, a planarization layer OC, a reflective layer RP, and a color conversion layer CCL'" sequentially stacked between a liquid crystal layer LCL and a first substrate SUB1.

The color conversion layer CCL'" may include first conversion part CCF1, second conversion part CCF2, and third conversion part CCF3, as well as include a light blocking part BM". In addition, the color conversion layer CCL'" may further include first optical filter FP1 and second optical filter FP2 disposed on the color conversion layer CCL'". The first optical filter FP1 is disposed on the first conversion part CCF1, and the second optical filter layer FP2 is disposed on the second conversion part CCF2. The structure of the first optical filter FP1 and the second optical filter is shown in FIGS. 10 and 11.

Referring to FIG. 11, the reflective layer RP may be disposed to cover a concave-convex portion of the color conversion layer CCL'". That is, the reflective layer RP may be provided on the color conversion layer CCL'" after the color conversion layer CCL'" is disposed on the first substrate SUB1 in a manufacturing process of the display device DD-3. Accordingly, the reflective layer RP is arranged along the concave-convex portion of the color conversion layer CCL'" disposed on the first substrate SUB1, and, in this manner, the reflective layer RP has a concave-convex portion corresponding to the concave-convex portion of the color conversion layer CCL'". The planarization layer OC is disposed on the reflective layer RP. In addition, the planarization layer OC is disposed to cover the concave-convex portion of the reflective layer RP. The planarization layer OC is disposed to fill the concave-convex of the lower surface of the reflective layer RP adjacent to the liquid crystal layer LCL to planarize the surface adjacent to the first polarizing layer PO1. The reflective layer RP arranged along the concave-convex portion of the color conversion layer CCL'" may be formed by directly coating a material for the reflective layer RP on the color conversion layer CCL'".

The light blocking part BM" of the color conversion layer CCL'" shown in FIG. 11 may be arranged to partially overlap with the first conversion part CCF1, the second conversion part CCF2, and the third conversion part CCF3 in the third direction DR3. That is, in the manufacturing process of the display device DD-3, a pattern for the light blocking part BM" may be formed on the first substrate SUB1 to define areas, and the first conversion part CCF1, the second conversion part CCF2, and the third conversion part CCF3 are respectively disposed in the areas. In this manner, a width of the light blocking part BM" in the first direction may be greater than a width of the light blocking part BM of FIG. 2.

According to one or more exemplary embodiments, the first alignment-inducing layer ALN1 may include the polymerized reactive mesogen. In addition, the second alignment-inducing layer ALN2 may include the polymerized reactive mesogen or the alignment layer including polyimide. As another example, the second alignment-inducing layer ALN2 may include both the polymerized reactive mesogen and polyimide.

FIG. 12 is a cross-sectional view of a display device, according to one or more exemplary embodiments.

As seen in FIG. 12, a display device DD-4 includes a first polarizing layer PO1 and a second polarizing layer PO2 disposed between the first substrate SUB1 and the second substrate SUB2. The first polarizing layer PO1 is disposed between the first substrate SUB1 and a first alignment-inducing layer ALN1, and the second polarizing layer PO2 is disposed between the second substrate SUB2 and a second alignment-inducing layer ALN2.

The display device DD-4 of FIG. 12 is different from the display devices shown in FIGS. 2, 7, and 10 in that a color conversion layer CCL may be disposed on the first substrate SUB1 in the display device DD-4. That is, the color conversion layer CCL of the display device DD-4 may be disposed on an upper surface of the first substrate SUB1. The upper surface of the first substrate SUB1 corresponds to a surface further away from another surface of the first substrate SUB1 that is more adjacent to the liquid crystal layer LCL than the surface.

Although not shown in FIG. 12, the display device DD-4 may further include a reflective layer and optical filter layers respectively corresponding to the reflective layer RP (refer to FIG. 10) and the optical filter layers FP1 and FP2 (refer to FIG. 10). For instance, the reflective layer may be disposed on a lower surface of the color conversion layer CCL, and the optical filter layers may be disposed on an upper surface of the color conversion layer CCL.

According to one or more exemplary embodiments, the first alignment-inducing layer ALN1 may include the polymerized reactive mesogen. In addition, the second alignment-inducing layer ALN2 may include the polymerized reactive mesogen or the alignment layer including polyimide. As another example, the second alignment-inducing layer ALN2 may include both the polymerized reactive mesogen and polyimide.

FIG. 13 is a cross-sectional view of a display device, according to one or more exemplary embodiments.

Different from the display devices of FIGS. 2, 7, 10, and 12, the display device DD-5 shown in FIG. 13 may further include a color filter layer CF. The display device DD-5 may also include a light source unit BLU and a display panel unit DP"". A first color light generated by the light source unit BLU is provided to the display panel unit DP"". The first color light is a blue light.

The display panel unit DP"" includes a first substrate SUB1, a second substrate SUB2 facing the first substrate SUB1, a first alignment-inducing layer ALN1 disposed adjacent to the first substrate SUB1, and a second alignment-inducing layer ALN2 disposed adjacent to the second substrate SUB2 such that the liquid crystal layer LCL is disposed between the first alignment-inducing layer ALN1 and the second alignment-inducing layer ALN2. In addition, the display panel unit DP"" may include a color conversion layer CCL"" disposed between the first substrate SUB1 and the first alignment-inducing layer ALN1. Further, a first polarizing layer PO1 may be disposed between the color conversion layer CCL"" and the first alignment-inducing layer ALN1.

The color conversion layer CCL"" may be provided as one layer in which light emitting areas by colors are not defined. As an example, the color conversion layer CCL'''' may be disposed on the first polarizing layer PO1 as one layer without being separated into, for instance, conversion parts, e.g., the first conversion part CCF1, the second conversion CCF2, and the third conversion part CCF3 of FIGS. 2, 7, and 10 through 12.

The color conversion layer CCL'''' may include a first illuminant EP1 and a second illuminant EP2. That is, the color conversion layer CCL'''' may include the first illuminant EP1 absorbing the blue light to emit the green light and the second illuminant EP2 absorbing the blue light to emit the red light. In this manner, the color conversion layer CCL'''' may provide a white light to the color filter layer CF. The color conversion layer CCL'''' may also include a base resin BR. The first illuminant EP1 and the second illuminant EP2 of the color conversion layer CCL'''' may be distributed in the base resin BR. In addition, the color conversion layer CCL'''' may further include scattering particles OP. The scattering particles OP may be TiO2 or silica-based nanoparticles.

The color filter layer CF includes a plurality of filter parts CF1, CF2, and CF3 and a light blocking part BM'''. The filter parts CF1, CF2, and CF3 may transmit different color lights from each other. The light blocking part BM''' may be disposed between the filter parts CF1, CF2, and CF3 adjacent to each other. For instance, the light blocking part BM''' may separate the filter parts CF1, CF2, and CF3 from each other. The light blocking part BM''' may be, but is not limited to, a black matrix. The light blocking part BM''' may include an organic or to inorganic light blocking material including a black pigment or dye. The light blocking part BM''' prevents (or at least reduces) light leakage from occurring and represents a boundary between the filter parts CF1, CF2, and CF3 adjacent to each other.

The color filter layer CF includes a first filter part CF1 transmitting the green light, a second filter part CF2 transmitting the red light, and a third filter part CF3 transmitting the blue light. The first filter part CF1 includes a green pigment, the second filter part includes a red pigment, and the third filter part CF3 includes a blue pigment.

According to one or more exemplary embodiments, since the display device DD-5 includes the color filter layer CF and the color conversion layer CCL'''', the display device DD-5 may have a high color purity compared with that when a display device only includes the color filter layer CF.

According to one or more exemplary embodiments, the first alignment-inducing layer ALN1 may include the polymerized reactive mesogen. In addition, the second alignment-inducing layer ALN2 may include the polymerized reactive mesogen or the alignment layer including polyimide. As another example, the second alignment-inducing layer ALN2 may include both the polymerized reactive mesogen and polyimide.

FIG. 14 is a cross-sectional view of a display device, according to one or more exemplary embodiments.

Referring to FIG. 14, the display device DD-6 may be a curved display device. In this manner, The display device DD-6 may include a curved first substrate SUB1' and a curved second substrate SUB2'. The display device DD-6 may otherwise have the same structure and function as those of the display device DD shown in FIG. 2, except for the curved first substrate SUB1' and the curved second substrate SUB2', as well as the curvature other components of the display device DD-6. The first substrate SUB1' may be curved at a first radius of curvature, and the second substrate SUB2' may be curved at a second radius of curvature. The second radius of curvature of the second substrate SUB2' may be greater than or equal to the first radius of curvature of the first substrate SUB1'. In addition, the light source unit BLU' may be curved corresponding to the curved shape of the first substrate SUB1' or the second substrate SUB2'.

The display device DD-6 may include the curved first substrate SUB1', the curved second substrate SUB2', a liquid crystal layer LCL' disposed between the first substrate SUB1' and the second substrate SUB2', a first alignment-inducing layer ALN1' disposed adjacent to the first substrate SUB1', and a second alignment-inducing layer ALN2' disposed adjacent to the second substrate SUB2' such that the liquid crystal layer LCL' is disposed between the first alignment-inducing layer ALN1' and the second alignment-inducing layer ALN2'. A first polarizing layer PO1' and a color conversion layer CCL'''' may be sequentially stacked on the first alignment-inducing layer ALN1', and a second polarizing layer PO2' may be disposed on a lower surface of the second substrate SUB2'.

According to one or more exemplary embodiments, the first alignment-inducing layer ALN1' may include the polymerized reactive mesogen. In addition, the second alignment-inducing layer ALN2' may include the polymerized reactive mesogen or the alignment layer including polyimide. As another example, the second alignment-inducing layer ALN2' may include both the polymerized reactive mesogen and polyimide.

In one or more exemplary embodiments, an average value of a pre-tilt angle of liquid crystal molecules LC1 arranged adjacent to the first alignment-inducing layer ALN1' among liquid crystal molecules may be different from an average value of a pre-tilt angle of liquid crystal molecules LC2 arranged adjacent to the second alignment-inducing layer ALN2' among the liquid crystal molecules.

For instance, the average value of the pre-tilt angle of the liquid crystal molecules LC1 arranged adjacent to the first alignment-inducing layer ALN1' may be greater than or equal to the average value of a pre-tilt angle of liquid crystal molecules LC2 arranged adjacent to the second alignment-inducing layer ALN2'. For example, the average value of the pre-tilt angle of the liquid crystal molecules LC1' arranged adjacent to the first alignment-inducing layer ALN1' may be greater than or equal to about 89 degrees and less than or equal to about 90 degrees. In addition, the average value of a pre-tilt angle of liquid crystal molecules LC2' arranged adjacent to the second alignment-inducing layer ALN2' may be greater than or equal to about 88 degrees and less than or equal to about 89 degrees.

According to one or more exemplary embodiments, an alignment-inducing layer is formed to include a polymerized reactive mesogen and a process of forming the alignment-inducing layer using polyimide may be omitted. In this manner, a corresponding display device may be prevented (or at least reduced) from being exposed to a high temperature process used during the manufacturing process of a display device including an alignment-inducing layer formed including polyimide. Accordingly, at least a first alignment-inducing layer may include the polymerized reactive mesogen, and, in this manner, a color conversion layer disposed adjacent to the first alignment-inducing layer may be prevented (or at least reduced) from burning and deteriorating. As such, the color conversion layer may be prevented (or at least reduced) from being exposed to the high temperature process, and, in this manner, the display device may have a relatively high color gamut and relatively high light emitting maintaining rate.

In one or more exemplary embodiments, since a display device allows an alignment-inducing layer to include a polymerized reactive mesogen formed by a photo-polymerization process instead of a high temperature process typically used to form an alignment-inducing layer including polyimide, when the alignment-inducing layer of one or more exemplary embodiments is formed to align the liquid crystal molecules, reliability of the display quality of the optical member including the color conversion layer and the polarizing layer may be improved.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
  a display panel; and
  a light source to provide a first color light to the display panel,
  wherein the display panel comprises:
    a first substrate;
    a second substrate facing the first substrate, the second substrate being disposed more adjacent to the light source than the first substrate;
    a liquid crystal layer disposed between the first substrate and the second substrate, the liquid crystal layer comprising liquid crystal molecules;
    a first alignment-inducing layer disposed between the first substrate and the liquid crystal layer, the first alignment-inducing layer comprising a polymerized first reactive mesogen and being devoid of polyimide;
    a second alignment-inducing layer disposed between the second substrate and the liquid crystal layer, the second alignment-inducing layer comprising polyimide; and
    a color conversion layer disposed on the liquid crystal layer, the color conversion layer comprising an illuminant to absorb the first color light from the light source to emit a color of light different from a first color of the first color light.

2. The display device of claim 1, wherein the second alignment-inducing layer further comprises a polymerized second reactive mesogen.

3. The display device of claim 1, wherein a thickness of the first alignment-inducing layer is less than or equal to a thickness of the second alignment-inducing layer.

4. The display device of claim 1, wherein the first alignment-inducing layer comprises a plurality of protrusions.

5. The display device of claim 2, wherein each of the first alignment-inducing layer and the second alignment-inducing layer comprises a plurality of protrusions.

6. The display device of claim 1, wherein the illuminant comprises:
  a first illuminant to absorb the first color light to emit a second color light, a second color of the second color light being different from the first color; and
  a second illuminant to absorb the first color light to emit a third color light, a third color of the third color light being different from the second color.

7. The display device of claim 6, wherein the color conversion layer comprises:
  a first conversion part comprising the first illuminant;
  a second conversion part comprising the second illuminant; and
  a third conversion part to transmit the first color light.

8. The display device of claim 7, wherein:
  the first conversion part, the second conversion part, and the third conversion part are spaced apart from each other when viewed in a plan view; and
  the color conversion layer further comprises a light blocking part disposed between the first conversion part, the second conversion part, and the third conversion part.

9. The display device of claim 6, wherein a particle size of the first illuminant is different from a particle size of the second illuminant.

10. The display device of claim 1, wherein the illuminant comprises at least one of a fluorescent substance and a quantum dot.

11. The display device of claim 1, wherein the color conversion layer further comprises:
  a base resin; and
  light scattering particles distributed in the base resin.

12. The display device of claim 1, wherein the display panel further comprises:
  a first polarizing layer disposed on the first substrate, the first polarizing layer comprising a polarizing axis in a first direction; and
  a second polarizing layer disposed on the second substrate, the second polarizing layer comprising a polarizing axis in a second direction substantially perpendicular to the first direction.

13. The display device of claim 12, wherein at least one of the first polarizing layer and the second polarizing layer is disposed between the first substrate and the second substrate.

14. The display device of claim 13, wherein:
  the first polarizing layer is disposed between the first alignment-inducing layer and the first substrate; and
  the color conversion layer is disposed on the first polarizing layer.

15. The display device of claim 14, wherein the color conversion layer is disposed between the first polarizing layer and the first substrate.

16. The display device of claim 6, further comprising:
  a reflective layer disposed between the color conversion layer and the liquid crystal layer,
  wherein the reflective layer is configured to:
    transmit the first color light; and
    reflect the second color light and the third color light.

17. The display device of claim 16, wherein:
  the reflective layer comprises:
    one or more first insulating layers, each first insulating layer of the one or more first insulating layers comprising a first refractive index; and
    one or more second insulating layers, each second insulating layer of the one or more second insulating layers comprising a second refractive index different from the first refractive index; and
  the one or more first insulating layers are alternately stacked with the one or more second insulating layers.

18. The display device of claim 7, further comprising:
  an optical filter layer disposed on the color conversion layer, the optical filter layer being configured to reflect the first color light.

19. The display device of claim 18, wherein the optical filter layer is further configured to transmit at least one of the second color light and the third color light.

20. The display device of claim 18, wherein the optical filter layer comprises:
  a first optical filter layer disposed on the first conversion part; and a second optical filter layer disposed on the second conversion part.

21. The display device of claim 20, wherein:
the first optical filter layer is configured to transmit the second color light; and
the second optical filter layer is configured to transmit the third color light.

22. The display device of claim 20, wherein:
the first optical filter layer comprises the first illuminant and a second color pigment to emit the second color light; and
the second optical filter layer comprises the second illuminant and a third color pigment to emit the third color light.

23. The display device of claim 1, further comprising:
a color filter layer disposed on the color conversion layer, wherein the color filter layer comprises:
    a plurality of filter parts to respectively emit light of different colors from each other; and
    a light blocking part separating the filter parts from each other, the light blocking part being disposed between adjacent filter parts.

24. The display device of claim 23, wherein:
the color conversion layer covers the filter parts; and
the color conversion layer further comprises:
    a base resin; and
    a scattering particle distributed in the base resin.

25. The display device of claim 24, wherein the illuminant comprises:
a first illuminant to absorb the first color light to emit a second color light, a second color of the second color light being different from the first color; and
a second illuminant to absorb the first color light to emit a third color light, a third color of the third color light being different from the second color.

26. The display device of claim 1, wherein
the polymerized first reactive mesogen comprises a compound represented by at least one of Formulae 1 and 2:

$$Pb\!-\!\!\left[\!Z_1\!\right]_{\overline{b1}}\!\!\left[\!L_1\!-\!A_1\!\right]_{\overline{a1}}\!\!\left[\!L_2\!\right]_{\overline{a2}}\!\!A_2\!-\!\!\left[\!Z_2\!\right]_{\overline{b2}}\!Pa \quad \text{Formula 1}$$

$$E\!-\!\!\left[\!Z_1\!\right]_{\overline{b3}}\!\!\left[\!L_1\!-\!B_1\!\right]_{\overline{a3}}\!\!\left[\!L_2\!\right]_{\overline{a4}}\!\!B_2\!-\!\!\left[\!Z_2\!\right]_{\overline{b4}}\!Pc \quad \text{Formula 2}$$

wherein $A_1$, $A_2$, $B_1$, and $B_2$ are each independently a substituted or unsubstituted divalent hydrocarbon ring, or a substituted or unsubstituted divalent heterocycle;
a1, a3, b1, b2, b3, and b4 are each independently an integer 0 to 6;
a2 and a4 are each independently an integer 0 or 1;
$L_1$ and $L_2$ are a linkage group;
$Z_1$ and $Z_2$ are a spacer group;
Pa, Pb, and Pc are a polymerizable group; and
E is a hydrogen bond functional group comprising at least one of a nitrogen atom and an oxygen atom.

27. The display device of claim 26, wherein the polymerized first reactive mesogen further comprises a vertical alignment group.

28. The display device of claim 1, wherein:
each of the first substrate and the second substrate is a curved substrate; and
the second alignment-inducing layer further comprises a second polymerized reactive mesogen.

29. The display device of claim 4, wherein the plurality of protrusions are randomly sized, shaped, and arranged.

30. A display device comprising:
a light source to emit a blue light; and
a display panel disposed on the light source, the display panel comprising a green light emitting area, a red light emitting area, and a blue light emitting area,
wherein the display panel further comprises:
    a first substrate;
    a second substrate facing the first substrate, the second substrate being disposed more adjacent to the light source than the first substrate;
    a liquid crystal layer disposed between the first substrate and the second substrate;
    a first alignment-inducing layer disposed between the first substrate and the liquid crystal layer, the first alignment-inducing layer comprising a polymerized reactive mesogen;
    a second alignment-inducing layer disposed between the second substrate and the liquid crystal layer;
    a color conversion layer disposed between the first alignment-inducing layer and the first substrate;
    a first polarizing layer disposed between the color conversion layer and the liquid crystal layer; and
    a second polarizing layer facing the first polarizing layer, the second polarizing layer being disposed more adjacent to the light source than the first polarizing layer, and
wherein the color conversion layer comprises:
    a first conversion part disposed in correspondence with the green light emitting area, the first conversion part comprising a first illuminant to absorb the blue light to emit a green light;
    a second conversion part disposed in correspondence with the red light emitting area, the second conversion part comprising a second illuminant to absorb the blue light to emit a red light; and
    a third conversion part disposed in correspondence with the blue light emitting area, the third conversion part being configured to transmit the blue light,
wherein the polymerized first reactive mesogen comprises a compound represented by at least one of Formulae 1 and 2:

$$Pb\!-\!\!\left[\!Z_1\!\right]_{\overline{b1}}\!\!\left[\!L_1\!-\!A_1\!\right]_{\overline{a1}}\!\!\left[\!L_2\!\right]_{\overline{a2}}\!\!A_2\!-\!\!\left[\!Z_2\!\right]_{\overline{b2}}\!Pa \quad \text{[Formula 1]}$$

$$E\!-\!\!\left[\!Z_1\!\right]_{\overline{b3}}\!\!\left[\!L_1\!-\!B_1\!\right]_{\overline{a3}}\!\!\left[\!L_2\!\right]_{\overline{a4}}\!\!B_2\!-\!\!\left[\!Z_2\!\right]_{\overline{b4}}\!Pc, \quad \text{[Formula 2]}$$

and
wherein:
    $A_1$, $A_2$, $B_1$, and $B_2$ are each independently a substituted or unsubstituted divalent hydrocarbon ring, or a substituted or unsubstituted divalent heterocycle;
    a1, a3, b1, b2, b3, and b4 are each independently an integer 0 to 6;
    a2 and a4 are each independently an integer 0 or 1;
    $L_1$ and $L_2$ are a linkage group;
    $Z_1$ and $Z_2$ are a spacer group;
    Pa, Pb, and Pc are a polymerizable group; and
    E is a hydrogen bond functional group comprising at least one of a nitrogen atom and an oxygen atom.

* * * * *